US009200102B2

(12) United States Patent
Baran, Jr. et al.

(10) Patent No.: US 9,200,102 B2
(45) Date of Patent: Dec. 1, 2015

(54) CATIONIC FLUORINATED POLYMER COMPOSITIONS AND METHODS FOR TREATING HYDROCARBON-BEARING FORMATIONS USING THE SAME

(75) Inventors: Jimmie R. Baran, Jr., Prescott, WI (US); George G. I. Moore, Afton, MI (US)

(73) Assignee: 3M Innovative Properties Company, St. Paul, MN (US)

(*) Notice: Subject to any disclaimer, the term of this patent is extended or adjusted under 35 U.S.C. 154(b) by 1324 days.

(21) Appl. No.: 13/054,626

(22) PCT Filed: Jul. 15, 2009

(86) PCT No.: PCT/US2009/050614
§ 371 (c)(1),
(2), (4) Date: Apr. 7, 2011

(87) PCT Pub. No.: WO2010/009182
PCT Pub. Date: Jan. 21, 2010

(65) Prior Publication Data
US 2011/0177983 A1    Jul. 21, 2011

Related U.S. Application Data

(60) Provisional application No. 61/081,826, filed on Jul. 18, 2008.

(51) Int. Cl.
*C09K 8/60* (2006.01)
*C08F 220/38* (2006.01)
(Continued)

(52) U.S. Cl.
CPC ............. *C08F 220/38* (2013.01); *C08F 220/34* (2013.01); *C09K 8/60* (2013.01); *E21B 43/25* (2013.01)

(58) Field of Classification Search
None
See application file for complete search history.

(56) References Cited

U.S. PATENT DOCUMENTS

| 2,732,398 A | 1/1956 | Brice |
| 2,803,615 A | 8/1957 | Ahlbrecht |

(Continued)

FOREIGN PATENT DOCUMENTS

| CA | 2009732 | 8/1990 |
| EP | 1311637 | 5/2003 |

(Continued)

OTHER PUBLICATIONS

Adibhatla, "Effect of Surfactants on Wettability of Near-weilbore Regions of Gas Reservoirs", Journal of Petroleum Science and Engineering, 2006, vol. 52, pp. 227-236. (XP002519991).

(Continued)

*Primary Examiner* — Alicia Bland

(57) ABSTRACT

Fluorinated polymers having first divalent units independently represented by formula (I) or formula (II) and second divalent units containing quaternary ammonium groups. Compositions containing the fluorinated polymer and solvent, methods of treating hydrocarbon-bearing formations using these compositions, and articles treated with the fluorinated polymers are disclosed. A method of making a composition containing the fluorinated polymer is also disclosed.

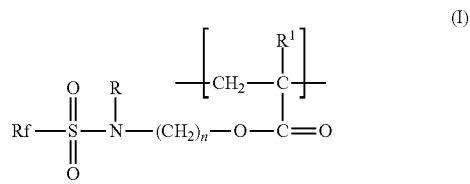

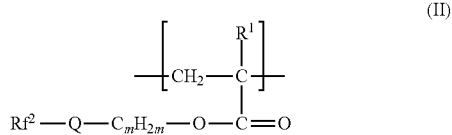

17 Claims, 3 Drawing Sheets

(51) Int. Cl.
*C08F 220/34* (2006.01)
*E21B 43/25* (2006.01)

(56) References Cited

U.S. PATENT DOCUMENTS

| | | | |
|---|---|---|---|
| 3,311,167 A | 3/1967 | O'Brien | |
| 3,394,758 A | 7/1968 | Terry | |
| 3,574,791 A | 4/1971 | Sherman | |
| 3,653,442 A | 4/1972 | Ross | |
| 3,728,151 A | 4/1973 | Sherman | |
| 3,902,557 A | 9/1975 | Shaughnessy | |
| 4,018,689 A | 4/1977 | Thompson | |
| 4,147,851 A * | 4/1979 | Raynolds | 526/245 |
| 4,200,154 A | 4/1980 | Tate | |
| 4,329,236 A | 5/1982 | Alford | |
| 4,432,882 A | 2/1984 | Raynolds | |
| 4,440,653 A | 4/1984 | Briscoe | |
| 4,460,791 A | 7/1984 | Cooke | |
| 4,557,837 A | 12/1985 | Clark, III | |
| 4,565,639 A | 1/1986 | Penny | |
| 4,594,200 A | 6/1986 | Penny | |
| 4,609,477 A | 9/1986 | Crema | |
| 4,702,849 A | 10/1987 | Penny | |
| 4,753,740 A | 6/1988 | Marlett | |
| 4,767,545 A | 8/1988 | Karydas | |
| 4,817,715 A | 4/1989 | Peru | |
| 4,823,873 A | 4/1989 | Karydas | |
| 4,921,619 A | 5/1990 | Karydas | |
| 4,923,009 A | 5/1990 | Watkins | |
| 4,993,448 A | 2/1991 | Karydas | |
| 4,997,580 A | 3/1991 | Karydas | |
| 5,042,578 A | 8/1991 | Cullick | |
| 5,092,405 A | 3/1992 | Prukop | |
| 5,129,457 A | 7/1992 | Sydansk | |
| 5,186,257 A | 2/1993 | Stahl | |
| 5,247,993 A | 9/1993 | Sarem | |
| 5,310,002 A | 5/1994 | Blauch | |
| 5,358,052 A | 10/1994 | Gidley | |
| 6,165,948 A | 12/2000 | Dewenter | |
| 6,182,759 B1 | 2/2001 | Burger | |
| 6,206,201 B1 | 3/2001 | Pusch | |
| 6,225,263 B1 | 5/2001 | Collins | |
| 6,306,944 B1 | 10/2001 | Seki | |
| 6,365,769 B1 | 4/2002 | Behr | |
| 6,521,730 B1 | 2/2003 | Pabon | |
| 6,566,470 B2 | 5/2003 | Kantamneni | |
| 6,579,572 B2 | 6/2003 | Espin | |
| 6,660,693 B2 | 12/2003 | Miller | |
| 6,664,354 B2 | 12/2003 | Savu | |
| 6,689,854 B2 | 2/2004 | Fan | |
| 6,720,371 B2 | 4/2004 | Furuta | |
| 6,729,409 B1 | 5/2004 | Gupta | |
| 6,852,781 B2 | 2/2005 | Savu | |
| 6,911,417 B2 | 6/2005 | Chan | |
| 6,945,327 B2 | 9/2005 | Ely | |
| 6,972,274 B1 | 12/2005 | Slikta | |
| 7,084,094 B2 | 8/2006 | Gunn | |
| 7,087,710 B2 | 8/2006 | Medsker | |
| 7,094,829 B2 | 8/2006 | Audenaert | |
| 7,165,613 B2 | 1/2007 | Chan | |
| 7,417,099 B2 | 8/2008 | Savu | |
| 7,470,741 B2 | 12/2008 | Dams | |
| 7,585,817 B2 | 9/2009 | Pope | |
| 7,629,298 B2 | 12/2009 | Arco | |
| 7,662,896 B2 | 2/2010 | Savu | |
| 7,772,162 B2 | 8/2010 | Pope | |
| 7,776,983 B2 | 8/2010 | Terrazas | |
| 7,855,169 B2 | 12/2010 | Pope | |
| 8,043,998 B2 | 10/2011 | Pope | |
| 8,138,127 B2 | 3/2012 | Pope | |
| 8,176,981 B2 | 5/2012 | Savu | |
| 8,236,737 B2 | 8/2012 | Fan | |
| 8,261,825 B2 | 9/2012 | Pope | |
| 8,403,050 B2 | 3/2013 | Pope | |
| 8,418,759 B2 | 4/2013 | Moore | |
| 2003/0092581 A1 | 5/2003 | Crews | |
| 2004/0185013 A1 | 9/2004 | Burgio | |
| 2005/0124738 A1 | 6/2005 | Sivik | |
| 2005/0244641 A1 | 11/2005 | Vincent | |
| 2006/0045979 A1 | 3/2006 | Dams | |
| 2006/0264334 A1 | 11/2006 | Gupta | |
| 2007/0015669 A1 | 1/2007 | Zhang | |
| 2007/0029085 A1 | 2/2007 | Panga | |
| 2007/0123430 A1 | 5/2007 | Pasquier | |
| 2009/0149616 A1 | 6/2009 | Audenaert | |
| 2009/0281002 A1 | 11/2009 | Casper | |
| 2010/0152071 A1 | 6/2010 | Pope | |
| 2010/0179262 A1 | 7/2010 | Dams | |
| 2010/0181068 A1 | 7/2010 | Pope | |
| 2010/0224361 A1 | 9/2010 | Pope | |
| 2010/0270019 A1 | 10/2010 | Pope | |
| 2010/0270020 A1 | 10/2010 | Baran, Jr. | |
| 2010/0270021 A1 | 10/2010 | Baran, Jr. | |
| 2010/0276142 A1 | 11/2010 | Skildum | |
| 2011/0056689 A1 | 3/2011 | Baran, Jr. | |
| 2011/0124532 A1 | 5/2011 | Maurer | |
| 2011/0136704 A1 | 6/2011 | Sharma | |
| 2011/0201531 A1 | 8/2011 | Sharma | |
| 2011/0247822 A1 | 10/2011 | Dams | |
| 2011/0247823 A1 | 10/2011 | Dams | |
| 2012/0071372 A1 | 3/2012 | Iaconelli | |
| 2012/0097393 A1 | 4/2012 | Dams | |

FOREIGN PATENT DOCUMENTS

| | | |
|---|---|---|
| GB | 2031482 | 4/1980 |
| JP | 2004191547 | 7/2004 |
| RU | 1706204 | 11/1994 |
| WO | WO 02/090402 | 11/2002 |
| WO | WO 02090402 A2 * | 11/2002 |
| WO | WO 03/089540 | 10/2003 |
| WO | WO 2005/028589 A1 | 3/2005 |
| WO | WO 2005/035936 A1 | 4/2005 |
| WO | WO 2007/017806 | 2/2007 |
| WO | WO 2007/033489 | 3/2007 |
| WO | WO 2007/097975 | 8/2007 |

OTHER PUBLICATIONS

Al-Anazi et al., "A Successful Methanol Treatment in a Gas-Condensate Reservoir: Field Application", Mar. 2003, SPE 80901, Society of Petroleum Engineers Inc., pp. 1-9.

Clark, H. B., et al., "Use of Fluorochemical Surfactants in Nonaqueous Stimulation Fields," *Journal of Petroleum Chemistry* vol. 32, No. 10 (1980) p. 1695-1697.

Crema et al., "Foaming of Anhydrous Methanol for Well Stimulation", Apr. 1985, SPE 13565, Society of Petroleum Engineers Inc., 4 pages.

Fahes, "Wettability Alteration to Intermediate Gas-Wetting in Gas-Condensate Reservoirs at High Temperatures", Oct. 9-12, 2005, SPE Annual Technical Conference and Exhibition, Dallas, TX, pp. 1-14. SPE 96184.

Kumar, "Improving the Gas and Condensate Relatives Permeability Using Chemical Treatments", May 15-17, 2006, SPE Gas Technology Symposium, Calgary, Alberta, pp. 1-9. SPE 100529.

Landfester, K., et al., "Convenient Synthesis of Fluorinated Latexes and Core-Shell Structures by Miniemuision Polymerization", *Macromolecules*, vol. 38 (2002), pp. 1658-1662.

Li, K. et al., "Experimental Study of Wettability Alteration to Preferential Gas-Wetting in Porous Media and Its Effects", SPE Reservoir Eval. and Eng 3(2), pp. 139-149, Apr. 2000.

McLeod, "The Use of Alcohol in Gas Well Stimulation", Nov. 10-11, 1996, SPE Eastern Regional Meeting, Columbus, Ohio, pp. 1-13. SPE 1663.

Noh et al., "Experimental Study of Wettability Alteration for Reservoir Rock", Project 3-Gas Condensate Reservoirs Part 2, Reservoir Engineering Research Instititute, Apr. 1-Jun. 30, 2Q.05.

Noh et al., "Effect of Wettability on High-Velocity Coefficient in Two-Phase Gas-Liquid Flow", SPE 102773, 2006 SPE Annual Technical Conference and Exhibition held in San Antonio, TX, Sep. 24-27, 2006.

(56) References Cited

OTHER PUBLICATIONS

Panga, "Preventive Treatment for Enhancing Water Removal from Gas Reservoirs by Wettability Alteration", Mar. 11-14, 2007, 15th SPE Middle East Oil & Gas Show and Conference, Kingdom of Bahrain, pp. 1-12. SPE 105367.

Tang, "Relative Permeability Modification in Gas/Liquid Systems Through Wettability Alteration to Intermediate Gas Wetting", SPE Reservoir Evaluation and Engineering, Dec. 2002, vol. 5, No. 6, pp. 427-436. SPE 81195.

Zhang, Yun-xiang et al., "Fluorocarbon-containing Hydrophobically Associating Polymers: II Synthesis and Characterization of Terpolymer of Acrylamide, Acryloyloxyethyl Trimethyl Ammonium Chloride and (N-ethyl perfluorooctane sulfoamido) Ethyl Acrylate", Polymers for Advanced Technologies, vol. 8 (1997), pp. 169-176.

International Search Report for PCT/US2009/050614, 3 pgs.

\* cited by examiner

CATIONIC FLUORINATED POLYMER COMPOSITIONS AND METHODS FOR TREATING HYDROCARBON-BEARING FORMATIONS USING THE SAME

CROSS-REFERENCE TO RELATED APPLICATIONS

This application is a national stage filing under 35 U.S.C. 371 of PCT/US2009/050614, filed Jul. 15, 2009, which claims priority to U.S. Provisional Application Ser. No. 61/081,826, filed Jul. 18, 2008, the disclosure of which is incorporated herein by reference in its entirety.

BACKGROUND

In the oil and gas industry, certain surfactants (including certain fluorinated surfactants) are known as fluid additives for various downhole operations (e.g., fracturing, waterflooding, and drilling). Often, these surfactants function to decrease the surface tension of the fluid or to stabilize foamed fluids.

Some hydrocarbon and fluorochemical compounds have been used to modify the wettability of reservoir rock, which may be useful, for example, to prevent or remedy water blocking (e.g., in oil or gas wells) or liquid hydrocarbon accumulation (e.g., in gas wells) in the vicinity of the well bore (i.e., the near well bore region). Water blocking and liquid hydrocarbon accumulation may result from natural phenomena (e.g., water-bearing geological zones or condensate banking) and/or operations conducted on the well (e.g., using aqueous or hydrocarbon fluids). Water blocking and condensate banking in the near well bore region of a hydrocarbon-bearing geological formation can inhibit or stop production of hydrocarbons from the well and hence are typically not desirable. Not all hydrocarbon and fluorochemical compounds, however, provide the desired wettability modification.

Solvent injection (e.g., injection of methanol) has been used to alleviate the problems of water blocking and condensate banking in gas wells, but this method may provide only a temporary benefit, and may not be desirable under some downhole conditions.

SUMMARY

Fluorinated polymers and methods of treating a hydrocarbon-bearing formation disclosed herein may be useful, for example, for increasing the permeability in hydrocarbon-bearing formations wherein two phases (i.e., a gas phase and an oil phase) of the hydrocarbons are present, (e.g., in gas wells having retrograde condensate and oil wells having black oil or volatile oil). The fluorinated polymers and methods are also typically useful for increasing the permeability in hydrocarbon-bearing formations having brine (e.g., connate brine and/or water blocking). Treatment of a near wellbore region of an oil and/or gas well that has at least one of brine or two phases of hydrocarbons in the near wellbore region may increase the productivity of the well. Although not wishing to be bound by theory, it is believed that the fluorinated polymers generally adsorb to at least one of hydrocarbon-bearing formations (e.g., siliciclastic formations) or proppants under downhole conditions and modify the wetting properties of the rock in the formation to facilitate the removal of hydrocarbons and/or brine. The fluorinated polymer may remain on the rock for the duration of an extraction of hydrocarbons from the formation (e.g., 1 week, 2 weeks, 1 month, or longer). Typically, and unexpectedly, the fluorinated polymers disclosed herein improve the permeability of hydrocarbon-bearing formations for a longer duration of time than non-polymeric fluorochemicals that contain a quaternary ammonium group. Typically, this increase in permeability at least one of (a) is higher than any increase in at least one of gas or liquid permeability obtained when an equivalent hydrocarbon-bearing formation is treated with a solvent (i.e., that doesn't contain a fluorinated polymer) or (b) the increase degrades at a slower rate than any increase in at least one of gas or liquid permeability obtained when an equivalent hydrocarbon-bearing formation is treated with a solvent.

In one aspect, the present disclosure provides a fluorinated polymer comprising:

first divalent units independently represented by formula:

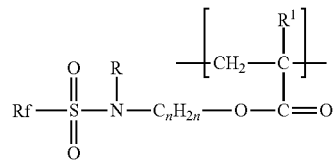

in a range from 15 to 80 percent by weight, based on the total weight of the fluorinated polymer, and second divalent units independently represented by formula:

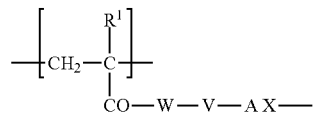

in a range from 20 to 85 percent by weight, based on the total weight of the fluorinated polymer, wherein Rf represents a fluoroalkyl group having from 1 to 6 carbon atoms;

each $R^1$ is independently hydrogen or methyl;

W is —O—, —S—, or —N(R)—;

V is alkylene that is optionally interrupted by at least one ether linkage or amine linkage and optionally substituted by hydroxyl;

A is

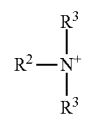

or a ring system having one or two independently saturated or unsaturated rings and a positively charged nitrogen atom;

R and $R^3$ are each independently alkyl having 1 to 4 carbon atoms;

$R^2$ is alkyl having 1 to 20 carbon atoms;

X— is a counter anion; and n is an integer from 2 to 11.

In another aspect, the present disclosure provides a composition comprising a fluorinated polymer disclosed herein and at least one of organic solvent or water. In some embodiments, the organic solvent comprises at least one of a polyol or polyol ether, each independently having from 2 to 25 carbon atoms. In some embodiments, the organic solvent comprises at least one monohydroxy alcohol, ether, or ketone, each independently having up to 4 carbon atoms.

In another aspect, the present disclosure provides a method of treating a hydrocarbon-bearing formation with a composition comprising a fluorinated polymer disclosed herein and at least one of organic solvent or water. In some of these embodiments, the hydrocarbon-bearing formation has both liquid hydrocarbons and gas, and the formation has at least a gas permeability that is increased after the formation is treated with the composition.

In another aspect, the present disclosure provides an article comprising a surface treated with a fluorinated polymer disclosed herein. In some embodiments, the article is a hydrocarbon-bearing formation (e.g., a hydrocarbon-bearing siliciclastic formation). In some of these embodiments, the siliciclastic formation is downhole. In some embodiments, the article is a particle (e.g., a proppant).

In another aspect, the present disclosure provides a method of increasing at least one of gas or liquid permeability in a hydrocarbon-bearing formation, the method comprising:

treating a hydrocarbon-bearing formation with a composition, the composition comprising solvent and a fluorinated polymer, the fluorinated polymer comprising:

first divalent units independently represented by formula:

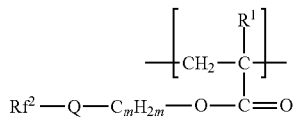

and second divalent units independently represented by formula:

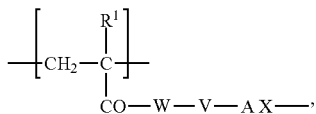

wherein $Rf^2$ represents a fluoroalkyl group having an average from 1 to 10 carbon atoms;

each $R^1$ is independently hydrogen or methyl;

Q is a bond or —$SO_2$—N(R)—;

W is —O—, —S—, or —N(R)—;

each R is independently alkyl having 1 to 4 carbon atoms;

V is alkylene that is optionally interrupted by at least one ether linkage or amine linkage and optionally substituted by hydroxyl;

A is

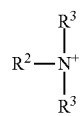

or a ring system having one or two independently saturated or unsaturated rings and a positively charged nitrogen atom;

each $R^3$ is independently alkyl having 1 to 4 carbon atoms;

$R^2$ is alkyl having 1 to 20 carbon atoms;

X— is a counter anion; and m is an integer from 1 to 11, wherein the hydrocarbon-bearing formation has an increase in the at least one of gas or liquid permeability of at least five percent after treating the hydrocarbon-bearing formation with the composition, and wherein at least one of (a) the increase is higher than any increase in at least one of gas or liquid permeability obtained when an equivalent hydrocarbon-bearing formation is treated with the solvent or (b) the increase degrades at a slower rate than any increase in at least one of gas or liquid permeability obtained when an equivalent hydrocarbon-bearing formation is treated with the solvent. In some embodiments, $Rf^2$ represents a fluoroalkyl group having up to 6 carbon atoms.

In some embodiments of the foregoing methods, the hydrocarbon-bearing formation is penetrated by a well bore, wherein a region near the well bore is treated with the composition. In some of these embodiments, the method further comprises obtaining (e.g., pumping or producing) hydrocarbons from the well bore after treating the hydrocarbon-bearing formation with the composition.

In another aspect, the present disclosure provides an article comprising a surface treated with a fluorinated polymer, wherein the article is either a hydrocarbon-bearing formation or a particle, and wherein the fluorinated polymer comprises:

first divalent units independently represented by formula:

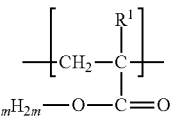

in a range from 15 to 80 percent by weight, based on the total weight of the fluorinated polymer; and second divalent units independently represented by formula:

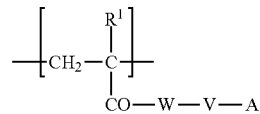

in a range from 20 to 85 percent by weight, based on the total weight of the fluorinated polymer, wherein $Rf^2$ represents a fluoroalkyl group having from 1 to 10 carbon atoms;

each $R^1$ is independently hydrogen or methyl;

Q is a bond or —$SO_2$—N(R)—;

W is —O—, —S—, or —N(R)—;

each R is independently alkyl having 1 to 4 carbon atoms;

V is alkylene that is optionally interrupted by at least one ether linkage or amine linkage and optionally substituted by hydroxyl;

A is

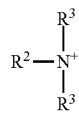

or a ring system having one or two independently saturated or unsaturated rings and a positively charged nitrogen atom;
each $R^3$ is independently alkyl having 1 to 4 carbon atoms;
$R^2$ is alkyl having 1 to 20 carbon atoms; and
m is an integer from 1 to 11.

In some embodiments, the article is a hydrocarbon-bearing siliciclastic formation. In some of these embodiments, the hydrocarbon-bearing siliciclastic formation is downhole. In some embodiments, the article is a particle (e.g., a proppant). In some embodiments, the fluorinated polymer is adsorbed on the article. In some embodiments, Q is —$SO_2N(R)$—, and $Rf^2$ represents a fluoroalkyl group having up to 6 carbon atoms. In some embodiments, Q is —$SO_2N(R)$—, R is methyl or ethyl, and $Rf^2$ represents a fluoroalkyl group having up to 4 carbon atoms. In some embodiments, W is —O—, V is alkylene having from 2 to 6 carbon atoms, A is

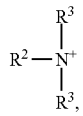

and $R^2$ and $R^3$ are each methyl.

In another aspect, the present disclosure provides a method of making a composition, the method comprising:
selecting a geological zone of a hydrocarbon-bearing formation, the geological zone having a temperature, a hydrocarbon composition, and a brine composition;
receiving data comprising the temperature and at least one of the hydrocarbon composition or the brine composition of the geological zone of the formation;
generating a formulation comprising a fluorinated polymer and solvent, wherein the fluorinated polymer comprises:
first divalent units independently represented by formula:

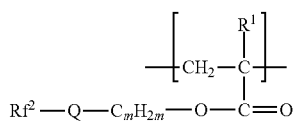

and
second divalent units independently represented by formula:

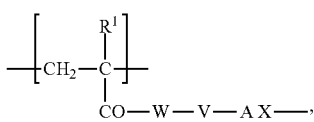

wherein
$Rf^2$ represents a fluoroalkyl group having an average from 1 to 10 carbon atoms;
each $R^1$ is independently hydrogen or methyl;
Q is a bond or —$SO_2$—N(R)—;
W is —O—, —S—, or —N(R)—;
each R is independently alkyl having 1 to 4 carbon atoms;
V is alkylene that is optionally interrupted by at least one ether linkage or amine linkage and optionally substituted by hydroxyl;
A is

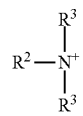

or a ring system having one or two independently saturated or unsaturated rings and a positively charged nitrogen atom;
each $R^3$ is independently hydrogen or alkyl having 1 to 4 carbon atoms;
$R^2$ is alkyl having 1 to 20 carbon atoms;
X— is a counter anion; and
m is an integer from 1 to 11,
wherein the formulation is generated based at least in part on compatibility information concerning the fluorinated polymer, the solvent, the temperature, and at least one of the hydrocarbon composition or the brine composition of the geological zone of the formation; and
making the composition according to the formulation.

In this application:

Terms such as "a", "an" and "the" are not intended to refer to only a singular entity, but include the general class of which a specific example may be used for illustration. The terms "a", "an", and "the" are used interchangeably with the term "at least one".

The phrase "at least one of" followed by a list refers to any one of the items in the list and any combination of two or more items in the list.

The term "brine" refers to water having at least one dissolved electrolyte salt therein (e.g., having any nonzero concentration, and which may be less than 1000 parts per million by weight (ppm), or greater than 1000 ppm, greater than 10,000 ppm, greater than 20,000 ppm, 30,000 ppm, 40,000 ppm, 50,000 ppm, 100,000 ppm, 150,000 ppm, or even greater than 200,000 ppm).

The term "hydrocarbon-bearing formation" includes both hydrocarbon-bearing formations in the field (i.e., subterranean hydrocarbon-bearing formations) and portions of such hydrocarbon-bearing formations (e.g., core samples).

The term "treating" includes placing a composition within a hydrocarbon-bearing formation using any suitable manner known in the art (e.g., pumping, injecting, pouring, releasing, displacing, spotting, or circulating the fluorinated polymer into a well, well bore, or hydrocarbon-bearing formation.

The term "solvent" refers to a homogeneous liquid material, which may be a single compound or a combination of compounds and which may or may not include water, that is capable of at least partially dissolving the fluorinated polymer disclosed herein at 25° C.

"Alkyl group" and the prefix "alk-" are inclusive of both straight chain and branched chain groups and of cyclic groups. Unless otherwise specified, alkyl groups herein have up to 20 carbon atoms. Cyclic groups can be monocyclic or polycyclic and, in some embodiments, have from 3 to 10 ring carbon atoms.

The term "polymer" refers to a molecule having a structure which essentially includes the multiple repetition of units derived, actually or conceptually, from molecules of low relative molecular mass. The term "polymer" encompasses oligomers.

The term "fluoroalkyl group" includes linear, branched, and/or cyclic alkyl groups in which all C—H bonds are replaced by C—F bonds as well as groups in which hydrogen or chlorine atoms are present instead of fluorine atoms provided that up to one atom of either hydrogen or chlorine is present for every two carbon atoms. In some embodiments of fluoroalkyl groups, when at least one hydrogen or chlorine is present, the fluoroalkyl group includes at least one trifluoromethyl group.

The term "productivity" as applied to a well refers to the capacity of a well to produce hydrocarbons (i.e., the ratio of the hydrocarbon flow rate to the pressure drop, where the pressure drop is the difference between the average reservoir pressure and the flowing bottom hole well pressure (i.e., flow per unit of driving force)). All numerical ranges are inclusive of their endpoints and non-integral values between the endpoints unless otherwise stated.

BRIEF DESCRIPTION OF THE DRAWINGS

For a more complete understanding of the features and advantages of the present disclosure, reference is now made to the detailed description along with the accompanying figures and in which.

DETAILED DESCRIPTION

Figure 1:
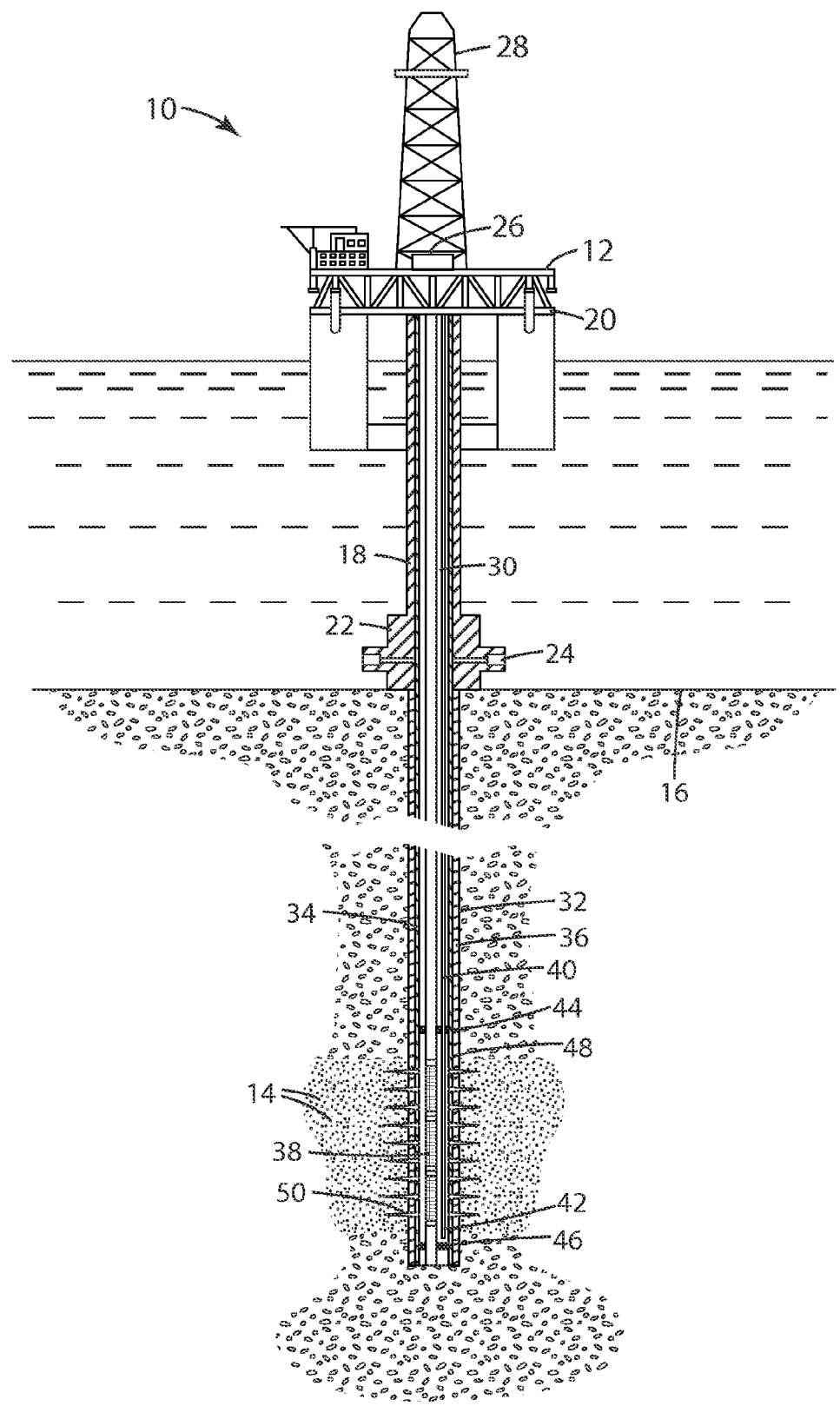
FIG. 1 is a schematic illustration of an exemplary embodiment of an offshore oil platform operating an apparatus for progressively treating a near wellbore region according to some embodiments of the present disclosure.

In some embodiments, fluorinated polymers according to the present disclosure comprise (e.g., at least 2, 3, 4, 5, 6, 7, 8, 9, 10, 15, or even at least 20 up 30, 35, 40, 45, 50, 100, or even up to 200) first divalent units independently represented by formula:

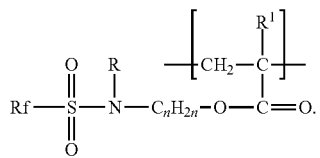

For divalent units of this formula, n is an integer from 2 to 11 (i.e., 2, 3, 4, 5, 6, 7, 8, 9, 10, or 11). In some embodiments, n is an integer from 2 to 6 or 2 to 4. R is alkyl having 1 to 4 carbon atoms (e.g., methyl, ethyl, n-propyl, isopropyl, n-butyl, or isobutyl). In some embodiments, R is methyl or ethyl.

In some embodiments of compositions useful in practicing the present disclosure, the fluorinated polymer comprises (e.g., at least 2, 3, 4, 5, 6, 7, 8, 9, 10, 15, or even at least 20 up to 30, 35, 40, 45, 50, 100, or even up to 200) first divalent units independently represented by formula:

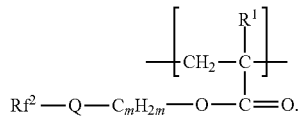

For divalent units having this formula, Q is a bond or —SO$_2$N (R)—, wherein R is alkyl having 1 to 4 carbon atoms (e.g., methyl, ethyl, n-propyl, isopropyl, n-butyl, or isobutyl). In some embodiments, Q is a bond. In some embodiments, Q is —SO$_2$N(R)—. In some of these embodiments, R is methyl or ethyl. m is an integer from 1 to 11 (i.e., 1, 2, 3, 4, 5, 6, 7, 8, 9, 10, or 11). In some of these embodiments, m is 1; in other of these embodiments, m is 2. In some embodiments wherein Q is —SO$_2$N(R)—, m is an integer from 2 to 11, 2 to 6, or 2 to 4. In some embodiments wherein Q is a bond, m is an integer from 1 to 6, 1 to 4, or 1 to 2. In embodiments wherein Q is a bond, it should be understood that the first divalent units may also be represented by formula:

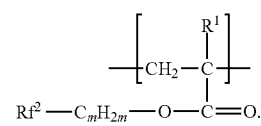

For any of the embodiments of the first divalent units having Rf groups, each Rf independently represents a fluorinated alkyl group having from 1 to 6 (in some embodiments, 2 to 6 or 2 to 4) carbon atoms (e.g., trifluoromethyl, perfluoroethyl, 1,1,2,2-tetrafluoroethyl, 2-chlorotetrafluoroethyl, perfluoro-n-propyl, perfluoroisopropyl, perfluoro-n-butyl, 1,1,2,3,3,3-hexafluoropropyl, perfluoroisobutyl, perfluoro-sec-butyl, or perfluoro-tert-butyl, perfluoro-n-pentyl, pefluoroisopentyl, or perfluorohexyl). In some embodiments, Rf is perfluorobutyl (e.g., perfluoro-n-butyl, perfluoroisobutyl, or perfluorosec-butyl). In some embodiments, Rf is perfluoropropyl (e.g., perfluoro-n-propyl or perfluoroisopropyl). Rf may contain a mixture of fluoroalkyl groups (e.g., with an average of up to 6 or 4 carbon atoms).

For any of the embodiments of the first divalent units having Rf$^2$ groups, each Rf$^2$ independently represents a fluorinated alkyl group having from 1 to 10 (in some embodiments, 1 to 8, 1 to 6, or even 2 to 4) carbon atoms (e.g., trifluoromethyl, perfluoroethyl, 1,1,2,2-tetrafluoroethyl, 2-chlorotetrafluoroethyl, perfluoro-n-propyl, perfluoroisopropyl, perfluoro-n-butyl, 1,1,2,3,3,3-hexafluoropropyl, perfluoroisobutyl, perfluoro-sec-butyl, or perfluoro-tert-butyl, perfluoro-n-pentyl, pefluoroisopentyl, perfluorohexyl, perfluoroheptyl, perfluorooctyl, perfluorononyl, or perfluorodecyl). In some embodiments, Rf$^2$ is perfluorobutyl (e.g., perfluoro-n-butyl, perfluoroisobutyl, or perfluoro-sec-butyl). In some embodiments, Rf$^2$ is perfluoropropyl (e.g., perfluoro-n-propyl or perfluoroisopropyl). Rf$^2$ may contain a mixture of fluoroalkyl groups (e.g., with an average of up to 8, 6, or 4 carbon atoms).

In some embodiments of fluorinated polymers according to and/or useful for practicing the present disclosure, the first divalent units have up to 6 fluorinated carbon atoms. This may be useful, for example, for minimizing foaming in compositions and methods disclosed herein.

For any of the embodiments of the first divalent units, $R^1$ is hydrogen or methyl. In some embodiments, $R^1$ is hydrogen. In some embodiments, $R^1$ is methyl.

Fluorinated polymers according to and/or useful in practicing the present disclosure comprise (e.g., at least 2, 3, 4, 5, 6, 7, 8, 9, 10, 15, or even at least 20 up 30, 35, 40, 45, 50, 100, or even up to 200) second divalent units independently represented by formula:

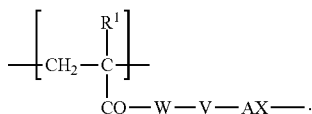

In some embodiments, the fluorinated polymer comprises more than 3 of the second divalent units.

For treated hydrocarbon-bearing siliciclastic formations according to the present disclosure, fluorinated polymers comprise (e.g., at least 2, 3, 4, 5, 6, 7, 8, 9, 10, 15, or even at least 20 up 30, 35, 40, 45, 50, 100, or even up to 200) second divalent units independently represented by formula:

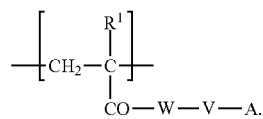

In some embodiments, the fluorinated polymer comprises more than 3 of the second divalent units, which may be advantageous, for example, for increasing the durability of a treatment composition disclosed herein.

For any of the embodiments of second divalent units, W is —O—, —S—, or —N(R)—, wherein R is alkyl having 1 to 4 carbon atoms (e.g., methyl, ethyl, n-propyl, isopropyl, n-butyl, or isobutyl). In some embodiments, W is —O—.

For any of the embodiments of second divalent units, V is alkylene that is optionally interrupted by at least one ether linkage or amine linkage and optionally substituted by hydroxyl. In some embodiments, V is alkylene that is optionally interrupted by at least one ether linkage. In some embodiments, V is alkylene having 2 to 10, 2 to 8, 2 to 6, 3 to 6, 3 to 8, or 3 to 10 carbon atoms.

For any of the embodiments of second divalent units, A is

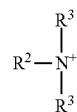

or a ring system having one or two independently saturated or unsaturated rings and a positively charged nitrogen atom. In some embodiments, A is

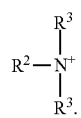

In some embodiments of fluorinated polymers according to and/or useful in practicing the present disclosure, each $R^3$ is independently alkyl having 1 to 4 carbon atoms (e.g., methyl, ethyl, n-propyl, isopropyl, n-butyl, or isobutyl). In some embodiments of fluorinated polymers useful in practicing the present disclosure, each $R^3$ is independently hydrogen or alkyl having 1 to 4 carbon atoms (e.g., methyl, ethyl, n-propyl, isopropyl, n-butyl, or isobutyl). $R^2$ is alkyl having 1 to 20 (1 to 15, 1 to 10, or even 1 to 6) carbon atoms. In some embodiments, A is a ring system having one or two independently saturated or unsaturated rings and a positively charged nitrogen atom (e.g., pyrrolium, pyrimidinium, pyrazolium, isoxazolium, oxazolium, thiazolium, isothiazolium, pyridinium, pyrazinium, pyridazinium, imidazolium, isoindolium, indolium, purinium, quinolinium, isoquinolinium, naphthyridinium, quinoxalinium, quinazolinium, phthalazinium, indazolium, indolinium, isoindolinium, pyrrolidinium, piperidinium, piperazinium, morpholinium, or azepinium). The phrase "ring system having one or two independently saturated or unsaturated rings and a positively charged nitrogen atom" means that if the ring system has two rings, one may be saturated and one may be unsaturated, both may be saturated, or both may be unsaturated. In some embodiments, A is a single aromatic ring having a positively charged nitrogen atom (e.g., pyrrolium, pyridinium, pyrazolium, isoxazolium, oxazolium, or imidazolium). In some embodiments, A is a single saturated ring having a positively charged nitrogen atom (e.g., pyrrolidinium, piperidinium, piperazinium, or morpholinium). In some embodiments, the ring system is a single ring having from 4 to 7 (or 5 to 6) ring members. In some embodiments, the ring system comprises two rings and has from 8 to 12 (or 9 to 11) ring members. In addition to carbon and nitrogen, the rings may also contain at least one of oxygen or sulfur. Although not wanting to be bound by theory, it is believed that for treated articles according to the present disclosure, the second divalent units may become bonded (e.g., through at least one of ionic bonding, covalent bonding, or hydrogen bonding) to the article through the A groups.

For any of the embodiments of second divalent units, X— is independently a counter anion. Typical counter anions include halides (i.e., fluoride, chloride, bromide, and iodide), organic acid salts (e.g., acetate, propionate, laurate, palmitate, stearate, or citrate), organic sulfonic or sulfuric acid salts (e.g., alkyl sulfates or alkanesulfonates), nitrate, and tetrafluoroborate. The organic acid salts and sulfonic acid salts may be partially fluorinated or perfluorinated. X— can also include anionic surfactants (e.g., fluorinated anionic surfactants). In some embodiments, X— is chloride, bromide, or iodide (i.e., Cl—, Br—, or I—).

In some embodiments, fluorinated polymers according to and/or useful in practicing the present disclosure are free of repeating alkyleneoxy units (e.g., having 2 to 6 carbon atoms, for example, ethyleneoxy or propyleneoxy).

For some embodiments of fluorinated polymers according to and/or useful in practicing the present disclosure, the number average molecular weight of the fluorinated polymer is in a range from 1500, 2000, 2500, or even 3000 grams per mole up to 10,000, 20,000, 25,000, 30,000, 40,000, 50,000, 60,000, 70,000, 80,000, 90,000, or 100,000 grams per mole although higher molecular weights may also be useful.

For some embodiments of fluorinated polymers according to and/or useful in practicing the present disclosure, the first divalent units are present in a range from 15 to 80, 20 to 80, 25 to 75, or 25 to 65 percent by weight, based on the total weight of the fluorinated polymer. In some embodiments, the second divalent units are present in a range from 20 to 85, 25 to 85, 25 to 80, or 30 to 70 percent by weight, based on the total weight of the fluorinated polymer. In some embodiments each of the first divalent units and the second divalent units are each present in a range from 35 to 65 percent by weight, based on the total weight of the fluorinated polymer. For some embodiments, the mole ratio of first divalent units to second divalent units in the fluorinated polymer is 4:1, 3:1, 2:1, 1:1, 1:2, or 1:3.

In some embodiments, fluorinated polymers according to and/or useful in practicing the present disclosure are free of silane groups (i.e., a group having at least one Si—O—Z moiety, wherein Z is H or substituted or unsubstituted alkyl or aryl). The absence of silane groups may be advantageous, for example, because silane groups may undergo hydrolysis and form polysiloxanes in the presence of some brines and at some temperatures when delivering the fluorinated polymer to a geological zone.

Fluorinated polymers according to and/or useful in practicing the present invention can be prepared, for example, by polymerizing a mixture of components typically in the presence of an initiator. By the term "polymerizing" it is meant forming a polymer or oligomer that includes at least one identifiable structural element due to each of the components. Typically the polymer or oligomer that is formed has a distribution of molecular weights and compositions.

The components that are useful for preparing the polymers disclosed herein include a fluorinated free-radically polymerizable monomer independently represented by formula $Rf^2$-Q-$(C_mH_{2m})$—O—C(O)—C($R^1$)=$CH_2$, wherein $Rf^2$, $R^1$, and m are as defined above.

Some compounds of Formula $Rf^2$-Q-$(C_mH_{2m})$—O—C(O)—C($R^1$)=$CH_2$, are available, for example, from commercial sources (e.g., 3,3,4,4,5,5,6,6,6-nonafluorohexyl acrylate from Daikin Chemical Sales, Osaka, Japan, 3,3,4,4, 5,5,6,6,6-nonafluorohexyl 2-methylacrylate from Indofine Chemical Co., Hillsborough, N.J., and 2,2,3,3,4,4,5,5-octafluoropentyl acrylate and methacrylate and 3,3,4,4,5,6,6,6-octafluoro-5-(trifluoromethyl)hexyl methacrylate from Sigma-Aldrich, St. Louis, Mo.). Others can be made by known methods (see, e.g., EP1311637 B1, published Apr. 5, 2006, for the preparation of 2,2,3,3,4,4,4-heptafluorobutyl 2-methylacrylate). Compounds wherein Q is —$SO_2N(R)$— can be made according to methods described in, e.g., U.S. Pat. Nos. 2,803,615 (Albrecht et al.) and U.S. Pat. No. 6,664,354 (Savu et al.), the disclosures of which, relating to free-radically polymerizable monomers and methods of their preparation.

Polymerizable monomers that may be useful for providing the second divalent units disclosed herein include compounds represented by formula A-V—W—C(O)—C($R^1$)=$CH_2$ X—, $(R^3)_2$N—V—W—C(O)—C($R^1$)=$CH_2$, and $R^3(R^2)$ N—V—W—C(O)—C($R^1$)=$CH_2$, wherein X—, A, V, W, $R^1$, $R^2$, and $R^3$ are as defined above. Some compounds having these formulas are available, for example, from commercial sources (e.g., 2-(dimethylamino)ethyl acrylate, 2-(dimethylamino)ethyl methacrylate, 3-(dimethylamino)propyl acrylate, N-[3-(dimethylamino)-propyl]methacrylamide, and 2-(tert-butylamino)ethyl methacrylate from Sigma-Aldrich and N,N-dimethylaminoethyl acrylate methyl chloride quaternary and N,N-dimethylaminoethyl methacrylate methyl chloride quaternary available from Ciba Specialty Chemicals, Basel, Switzerland, under the trade designations "CIBA AGEFLEX FA1Q80MC" and "CIBA AGEFLEX FM1Q75MC", respectively). Tertiary amine-containing acrylates (e.g., 2-(dimethylamino)ethyl acrylate, 2-(dimethylamino)ethyl methacrylate, or 3-(dimethylamino)propyl acrylate) can be quaternized using conventional techniques, for example, by reaction with an alkyl halide (e.g., bromobutane, bromoheptane, bromodecane, bromododecane, or bromohexadecane) in a suitable solvent and optionally in the presence of a free-radical inhibitor to provide a compound of formula A-V—W—C(O)—C($R^1$)=$CH_2$ X—. Quaternization can also be carried out, for example, after a tertiary amine-containing acrylate is polymerized. Other compounds represented by formula A-V—W—C(O)—C($R^1$)=$CH_2$ X— can be prepared, for example, by reacting amino alcohols (e.g., 1-piperidinepropanol, 1-(2-hydroxyethyl)pyrrolidine, 4-(2-hydroxyethyl)morpholine, and 1-(2-hydroxyethyl)imidazole) with acryloyl chloride or acrylic acid, and quaternizing.

Free radical initiators such as those widely known and used in the art may be used to initiate polymerization of the components. Examples of free-radical initiators include azo compounds (e.g., 2,2'-azobisisobutyronitrile (AIBN), 2,2'-azobis (2-methylbutyronitrile), or azo-2-cyanovaleric acid); hydroperoxides (e.g., cumene, tert-butyl or tent-amyl hydroperoxide); dialkyl peroxides (e.g., di-tert-butyl or dicumylperoxide); peroxyesters (e.g., tert-butyl perbenzoate or di-tent-butyl peroxyphthalate); diacylperoxides (e.g., benzoyl peroxide or lauryl peroxide). Useful photoinitiators include benzoin ethers (e.g., benzoin methyl ether or benzoin butyl ether); acetophenone derivatives (e.g., 2,2-dimethoxy-2-phenylacetophenone or 2,2-diethoxyacetophenone); and acylphosphine oxide derivatives and acylphosphonate derivatives (e.g., diphenyl -2,4,6-trimethylbenzoylphosphine oxide, isopropoxyphenyl-2,4,6-trimethylbenzoylphosphine oxide, or dimethyl pivaloylphosphonate). When heated or photolyzed such free-radical initiators fragment to generate free radicals which add to ethylenically unsaturated bonds and initiate polymerization.

Polymerization reactions may be carried out in any solvent suitable for organic free-radical polymerizations. The components may be present in the solvent at any suitable concentration, (e.g., from about 5 percent to about 90 percent by weight based on the total weight of the reaction mixture). Examples of suitable solvents include aliphatic and alicyclic hydrocarbons (e.g., hexane, heptane, cyclohexane), aromatic solvents (e.g., benzene, toluene, xylene), ethers (e.g., diethyl ether, glyme, diglyme, diisopropyl ether), esters (e.g., ethyl acetate, butyl acetate), alcohols (e.g., ethanol, isopropyl alcohol), ketones (e.g., acetone, methyl ethyl ketone, methyl isobutyl ketone), sulfoxides (e.g., dimethyl sulfoxide), amides (e.g., N,N-dimethylformamide, N,N-dimethylacetamide), halogenated solvents (e.g., methylchloroform, 1,1,2-trichloro-1,2,2-trifluoroethane, trichloroethylene or trifluorotoluene), and mixtures thereof.

Polymerization can be carried out at any temperature suitable for conducting an organic free-radical reaction. Particular temperature and solvents for use can be selected by those skilled in the art based on considerations such as the solubility of reagents, the temperature required for the use of a particular initiator, and the molecular weight desired. While it is not practical to enumerate a particular temperature suitable for all initiators and all solvents, generally suitable temperatures are in a range from about 30° C. to about 200° C.

Free-radical polymerizations may be carried out in the presence of chain transfer agents. Typical chain transfer agents that may be used in the preparation of polymers described herein include hydroxyl-substituted mercaptans (e.g., 2-mercaptoethanol, 3-mercapto-2-butanol, 3-mercapto-2-propanol, 3-mercapto-1-propanol, and 3-mercapto-1,2-propanediol (i.e., thioglycerol)); amino-substituted mercaptans (e.g., 2-mercaptoethylamine); difunctional mercaptans (e.g., di(2-mercaptoethyl)sulfide); and aliphatic mercaptans (e.g., octylmercaptan, dodecylmercaptan, and octadecylmercaptan).

Adjusting, for example, the concentration and activity of the initiator, the concentration of each of the reactive monomers, the temperature, the concentration of the chain transfer agent, and the solvent using techniques known in the art can control the molecular weight of a polyacrylate copolymer.

Fluorinated polymers according to and/or useful for practicing the present disclosure may contain other divalent units, typically in weight percents up to 20, 15, 10, or 5 percent, based on the total weight of the fluorinated polymer. These divalent units may be incorporated into the polymer chain by selecting additional components for the polymerization reaction such as alkyl acrylates and methacrylates (e.g., octadecyl methacrylate, lauryl methacrylate, butyl acrylate, isobutyl methacrylate, ethylhexyl acrylate, ethylhexyl methacrylate, methyl methacrylate, hexyl acrylate, heptyl methacrylate, cyclohexyl methacrylate, or isobornyl acrylate); allyl esters (e.g., allyl acetate and allyl heptanoate); vinyl ethers or allyl ethers (e.g., cetyl vinyl ether, dodecylvinyl ether, 2-chloroethylvinyl ether, or ethylvinyl ether); alpha-beta unsaturated nitriles (e.g., acrylonitrile, methacrylonitrile, 2-chloroacrylonitrile, 2-cyanoethyl acrylate, or alkyl cyanoacrylates); alpha-beta-unsaturated carboxylic acid derivatives (e.g., allyl alcohol, allyl glycolate, acrylamide, methacrylamide, n-diisopropyl acrylamide, or diacetoneacrylamide); styrene and its derivatives (e.g., vinyltoluene, alpha-methylstyrene, or alpha-cyanomethyl styrene); olefinic hydrocarbons which may contain at least one halogen (e.g., ethylene, propylene, isobutene, 3-chloro-1-isobutene, butadiene, isoprene, chloro and dichlorobutadiene, 2,5-dimethyl-1,5-hexadiene, and vinyl and vinylidene chloride); and hydroxyalkyl-substituted polymerizable compounds (e.g., 2-hydroxyethyl methacrylate). Other divalent units containing pendent fluorinated groups include those derived from vinyl ethers, vinyl esters, allyl esters, vinyl ketones, styrene, vinyl amide, and acrylamides.

Typically, in compositions according to and/or useful for practicing any of the methods described herein, the fluorinated polymer is present in the composition at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, 0.5, 1, 1.5, 2, 3, 4, or 5 percent by weight, up to 5, 6, 7, 8, 9, or 10 percent by weight, based on the total weight of the composition. For example, the amount of the fluorinated polymer in the compositions may be in a range of from 0.01 to 10, 0.1 to 10, 0.1 to 5, 1 to 10, or even in a range from 1 to 5 percent by weight, based on the total weight of the composition. Lower and higher amounts of the fluorinated polymer in the compositions may also be used, and may be desirable for some applications.

Compositions according to and/or useful in practicing the present disclosure comprise solvent. Examples of useful solvents for any of these methods include organic solvents, water, easily gasified fluids (e.g., ammonia, low molecular weight hydrocarbons, and supercritical or liquid carbon dioxide), and combinations thereof. In some embodiments, the compositions are essentially free of water (i.e., contains less than 0.1 percent by weight of water based on the total weight of the composition). In some embodiments, the solvent is a water-miscible solvent (i.e., the solvent is soluble in water in all proportions). Examples of organic solvents include polar and/or water-miscible solvents, for example, monohydroxy alcohols having from 1 to 4 or more carbon atoms (e.g., methanol, ethanol, isopropanol, propanol, or butanol); polyols such as glycols (e.g., ethylene glycol or propylene glycol), terminal alkanediols (e.g., 1,3-propanediol, 1,4-butanediol, 1,6-hexanediol, or 1,8-octanediol), polyglycols (e.g., diethylene glycol, triethylene glycol, dipropylene glycol, or polypropylene glycol)), triols (e.g., glycerol, trimethylolpropane), or pentaerythritol; ethers such as diethyl ether, methyl t-butyl ether, tetrahydrofuran, p-dioxane, or polyol ethers (e.g., glycol ethers (e.g., ethylene glycol monobutyl ether, diethylene glycol monomethyl ether, dipropylene glycol monomethyl ether, propylene glycol monomethyl ether, 2-butoxyethanol, or those glycol ethers available under the trade designation "DOWANOL" from Dow Chemical Co., Midland, Mich.)); ketones (e.g., acetone or 2-butanone); and combinations thereof.

In some embodiments of the compositions, treatment methods, and the methods of making a composition disclosed herein, the solvent comprises at least one of a polyol or polyol ether independently having from 2 to 25 (in some embodiments, 2 to 15, 2 to 10, 2 to 9, or 2 to 8) carbon atoms. In some embodiments, the solvent comprises a polyol. The term "polyol" refers to an organic molecule consisting of C, H, and O atoms connected one to another by C—H, C—C, C—O, O—H single bonds, and having at least two C—O—H groups. In some embodiments, useful polyols have 2 to 25, 2 to 20, 2 to 15, 2 to 10, 2 to 8, or 2 to 6 carbon atoms. In some embodiments, the solvent comprises a polyol ether. The term "polyol ether" refers to an organic molecule consisting of C, H, and O atoms connected one to another by C—H, C—C, C—O, O—H single bonds, and which is at least theoretically derivable by at least partial etherification of a polyol. In some embodiments, the polyol ether has at least one C—O—H group and at least one C—O—C linkage. Useful polyol ethers may have from 3 to 25 carbon atoms, 3 to 20, 3 to 15, 3 to 10, 3 to 8, or from 5 to 8 carbon atoms. In some embodiments, the polyol is at least one of ethylene glycol, propylene glycol, poly(propylene glycol), 1,3-propanediol, or 1,8-octanediol, and the polyol ether is at least one of 2-butoxyethanol, diethylene glycol monomethyl ether, ethylene glycol monobutyl ether, dipropylene glycol monomethyl ether, or 1-methoxy-2-propanol. In some embodiments, the polyol and/or polyol ether has a normal boiling point of less than 450° F. (232° C.), which may be useful, for example, to facilitate removal of the polyol and/or polyol ether from a well after treatment. In some embodiments, the solvent comprises at least one of 2-butoxyethanol, ethylene glycol, propylene glycol, poly(propylene glycol), 1,3-propanediol, 1,8-octanediol, diethylene glycol monomethyl ether, ethylene glycol monobutyl ether, or dipropylene glycol monomethyl ether.

In some embodiments of compositions, treatment methods, and methods of making a composition disclosed herein, the solvent comprises at least one of water, a monohydroxy alcohol, an ether, or a ketone, wherein the monohydroxy alcohol, the ether, and the ketone each independently have up to 4 carbon atoms. Exemplary monohydroxy alcohols having from 1 to 4 carbon atoms include methanol, ethanol, n-propanol, isopropanol, 1-butanol, 2-butanol, isobutanol, and t-butanol. Exemplary ethers having from 2 to 4 carbon atoms include diethyl ether, ethylene glycol methyl ether, tetrahydrofuran, p-dioxane, and ethylene glycol dimethyl ether. Exemplary ketones having from 3 to 4 carbon atoms include acetone, 1-methoxy-2-propanone, and 2-butanone. In some embodiments, useful solvents for practicing the methods disclosed herein comprise at least one of methanol, ethanol, isopropanol, tetrahydrofuran, or acetone.

In some embodiments of the compositions, treatment methods, and the methods of making a composition disclosed herein, the compositions comprise at least two organic solvents. In some embodiments, the solvent comprises at least one of a polyol or polyol ether independently having from 2 to 25 (in some embodiments, 2 to 15, 2 to 10, 2 to 9, or 2 to 8) carbon atoms and at least one of water, a monohydroxy alcohol, an ether, or a ketone, wherein the monohydroxy alcohol, the ether, and the ketone each independently have up to 4 carbon atoms. In these embodiments, in the event that a component of the solvent is a member of two functional classes, it may be used as either class but not both. For example, ethylene glycol monomethyl ether may be a polyol ether or a monohydroxy alcohol, but not as both simultaneously. In these embodiments, each solvent component may be present as a single component or a mixture of components. In some embodiments, compositions useful for practicing any of the methods disclosed herein comprise at least one of a polyol or polyol ether independently having from 2 to 25 (in some embodiments, 2 to 15, 2 to 10, 2 to 9, or 2 to 8) carbon atoms and at least one monohydroxy alcohol having up to 4 carbon atoms. In some embodiments, the solvent consists essentially of (i.e., does not contain any components that materially affect water solubilizing or displacement properties of the composition under downhole conditions) at least one of a polyol having from 2 to 25 (in some embodiments, 2 to 20, 2 to 15, 2 to 10, 2 to 9, 2 to 8, or 2 to 6) carbon atoms or polyol ether having from 3 to 25 (in some embodiments, 3 to 20, 3 to 15, 3 to 10, 3 to 9, 3 to 8, or from 5 to 8) carbon atoms, and at least one monohydroxy alcohol having from 1 to 4 carbon atoms, ether having from 2 to 4 carbon atoms, or ketone having from 3 to 4 carbon atoms.

For any of the embodiments of the compositions, treatment methods, and methods of making a composition disclosed herein, wherein the compositions comprise at least one of a polyol or polyol ether independently having from 2 to 25 (in some embodiments, 2 to 15, 2 to 10, 2 to 9, or 2 to 8) carbon atoms, the polyol or polyol ether is present in the composition at least 50, 55, 60, or 65 percent by weight and up to 75, 80, 85, or 90 percent by weight, based on the total weight of the composition. Typically, the solvents disclosed herein are capable of solubilizing more brine in the presence of a fluorinated polymer than methanol, ethanol, propanol, butanol, or acetone alone. In some embodiments of the methods disclosed herein, the solvent comprises up to 50, 40, 30, 20, or 10 percent by weight of a monohydroxy alcohol having up to 4 carbon atoms, based on the total weight of the composition.

For any of the embodiments wherein the compositions according to and/or useful for practicing the methods disclosed herein comprise at least two organic solvents, the solvents may be, for example, those shown in Table 1, below, wherein the exemplary parts by weight are based on the total weight of solvent.

TABLE 1

| SOLVENT 1 (parts by weight) | SOLVENT 2 (parts by weight) |
| --- | --- |
| 1,3-propanediol (80) | isopropanol (IPA) (20) |
| propylene glycol (PG) (70) | IPA (30) |
| PG (90) | IPA (10) |
| PG (80) | IPA (20) |
| ethylene glycol (EG) (50) | ethanol (50) |
| EG (70) | ethanol (30) |
| propylene glycol monobutyl ether (PGBE) (50) | ethanol (50) |
| PGBE (70) | ethanol (30) |
| dipropylene glycol monomethyl ether (DPGME) (50) | ethanol (50) |
| DPGME (70) | ethanol (30) |

TABLE 1-continued

| SOLVENT 1 (parts by weight) | SOLVENT 2 (parts by weight) |
| --- | --- |
| diethylene glycol monomethyl ether (DEGME) (70) | ethanol (30) |
| triethylene glycol monomethyl ether (TEGME) (50) | ethanol (50) |
| TEGME (70) | ethanol (30) |
| 1,8-octanediol (50) | ethanol (50) |
| PG (70) | tetrahydrofuran (THF) (30) |
| PG (70) | acetone (30) |
| PG (70) | methanol (30) |
| PG (60) | IPA (40) |
| 2-butoxyethanol (BE) (80) | ethanol (20) |
| BE (70) | ethanol (30) |
| BE (60) | ethanol (40) |
| PG (70) | ethanol (30) |
| EG (70) | IPA (30) |
| glycerol (70) | IPA (30) |

The amount of solvent typically varies inversely with the amount of other components in compositions according to and/or useful in practicing the present disclosure. For example, based on the total weight of the composition the solvent may be present in the composition in an amount of from at least 10, 20, 30, 40, or 50 percent by weight or more up to 60, 70, 80, 90, 95, 98, or 99 percent by weight, or more.

The ingredients for compositions described herein including fluorinated polymers, solvents, and optionally water can be combined using techniques known in the art for combining these types of materials, including using conventional magnetic stir bars or mechanical mixer (e.g., in-line static mixer and recirculating pump).

Although not wishing to be bound by theory, it is believed that treatment methods according to the present disclosure will provide more desirable results when the composition is homogenous at the temperature(s) encountered in the hydrocarbon-bearing formation. Whether the composition is homogeneous at the temperature can depend on many variables (e.g., concentration of the fluorinated polymer, solvent composition, brine concentration and composition, hydrocarbon concentration and composition, and the presence of other components (e.g., surfactants)). It is believed that once the composition contacts a hydrocarbon-bearing formation (e.g., downhole), the environment will cause the fluorinated polymer to become less soluble in the composition and adsorb onto at least one of the formation or at least a portion of a plurality of proppants located in a fracture in the formation. Once adsorbed onto the formation or at least a portion of a plurality of proppants, the fluorinated polymer can modify the wetting properties of the formation and cause an increase in at least one of the gas or oil permeabilities in the formation. It is believed that low-foaming fluorinated polymers and compositions are more effective for increasing the gas permeability of hydrocarbon-bearing formations.

In some embodiments of treatment methods according to the present disclosure, the hydrocarbon-bearing formation has brine. The brine present in the formation may be from a variety of sources including at least one of connate water, flowing water, mobile water, immobile water, residual water from a fracturing operation or from other downhole fluids, or crossflow water (e.g., water from adjacent perforated formations or adjacent layers in the formations). The brine may cause water blocking in the hydrocarbon-bearing formation. In some embodiments, the solvent at least one of at least partially solubilizes or at least partially displaces brine in the hydrocarbon-bearing formation. In some embodiments, the brine has at least 2, 3, 4, 5, 6, 7, 8, 9, or even at least 10 weight percent dissolved salts (e.g., sodium chloride, calcium chloride, strontium chloride, magnesium chloride, potassium chloride, ferric chloride, ferrous chloride, and hydrates thereof), based on the total weight of the brine. Although not wanting to be bound by theory, it is believed that the effectiveness of the treatment methods disclosed herein for improving hydrocarbon productivity of a particular oil and/or gas well having brine accumulated in the near wellbore region will typically be determined by the ability of the composition to dissolve or displace the quantity of brine present in the near wellbore region of the well without causing phase separation of the fluorinated polymer or precipitation. Hence, at a given temperature greater amounts of compositions having lower brine solubility (i.e., compositions that can dissolve a relatively lower amount of brine) will typically be needed than in the case of compositions having higher brine solubility and containing the same fluorinated polymer at the same concentration.

In some embodiments of the treatment methods disclosed herein, when the composition treats the hydrocarbon-bearing formation, the hydrocarbon-bearing formation is substantially free of precipitated salt. As used herein, the term "substantially free of precipitated salt" refers to an amount of salt that does not interfere with the ability of the fluorinated polymer to increase the gas permeability of the hydrocarbon-bearing formation. In some embodiments, "substantially free of precipitated salt" means that no precipitated salt is visually observed. In some embodiments, "substantially free of precipitated salt" is an amount of salt that is less than 5% by weight higher than the solubility product at a given temperature and pressure.

In some embodiments of treatment methods according to the present disclosure, combining the composition and the brine of the hydrocarbon-bearing formation at the temperature of the hydrocarbon-bearing formation does not result in the phase separation of the fluorinated polymer. Phase behavior can be evaluated prior to treating the hydrocarbon-bearing formation with the composition by obtaining a sample of the brine from the hydrocarbon-bearing formation and/or analyzing the composition of the brine from the hydrocarbon-bearing formation and preparing an equivalent brine having the same or similar composition to the composition of the brine in the formation. The brine saturation level in a hydrocarbon-bearing formation can be determined using methods known in the art and can be used to determined the amount of brine that can be mixed with the fluorinated polymer-solvent composition. The brine and the composition (i.e., the fluorinated polymer-solvent composition) are combined (e.g., in a container) at the temperature and then mixed together (e.g., by shaking or stirring). The mixture is then maintained at the temperature for 15 minutes, removed from the heat, and immediately visually evaluated to see if it phase separates or if cloudiness or precipitation occurs. In some embodiments, the amount of brine that is added before phase separation occurs is at least 5, 10, 15, 20, 25, 30, 35, 40, 45, or at least 50% by weight, based on the total weight of brine and fluorinated polymer-solvent composition combined in the phase behavior evaluation.

The phase behavior of the composition and the brine can be evaluated over an extended period of time (e.g., 1 hour, 12 hours, 24 hours, or longer) to determine if any phase separation, precipitation, or cloudiness is observed. By adjusting the relative amounts of brine (e.g., equivalent brine) and the fluorinated polymer-solvent composition, it is possible to determine the maximum brine uptake capacity (above which phase separation or salt precipitation occurs) of the fluorinated polymer-solvent composition at a given temperature. Varying the temperature at which the above procedure is carried out typically results in a more complete understanding of the suitability of fluorinated polymer-solvent compositions as treatment compositions for a given well.

In some embodiments of the treatment methods disclosed herein, the hydrocarbon-bearing formation has both liquid hydrocarbons and gas, and the hydrocarbon-bearing formation has at least a gas permeability that is increased after the hydrocarbon-bearing formation is treated with the composition. In some embodiments, the gas permeability after treating the hydrocarbon-bearing formation with the composition is increased by at least 5 percent (in some embodiments, by at least 10, 15, 20, 30, 40, 50, 60, 70, 80, 90, or 100 percent or more) relative to the gas permeability of the formation before treating the formation with the composition. In some embodiments, the gas permeability is a gas relative permeability. In some embodiments, the liquid (e.g., oil or condensate) permeability in the hydrocarbon-bearing formation is also increased (in some embodiments, by at least 5, 10, 15, 20, 30, 40, 50, 60, 70, 80, 90, or 100 percent or more) after treating the formation with the composition.

In some embodiments, the increase in gas permeability of the treated hydrocarbon-bearing formation is higher than an increase in gas permeability obtained when an equivalent hydrocarbon-bearing formation is treated with the solvent. The term "equivalent hydrocarbon-bearing formation" refers to a hydrocarbon-bearing formation that is similar to or the same (e.g., in chemical make-up, surface chemistry, brine composition, and hydrocarbon composition) as a hydrocarbon-bearing formation disclosed herein before it is treated with a method according to the present disclosure. In some embodiments, both the hydrocarbon-bearing formation and the equivalent hydrocarbon-bearing formation are siliciclastic formations, in some embodiments, greater than 50 percent sandstone. In some embodiments, the hydrocarbon-bearing formation and the equivalent hydrocarbon-bearing formation may have the same or similar pore volume and porosity (e.g., within 15 percent, 10 percent, 8 percent, 6 percent, or even within 5 percent).

The hydrocarbon-bearing formation having both gas and liquid hydrocarbons may have gas condensate, black oil, or volatile oil and may comprise, for example, at least one of methane, ethane, propane, butane, pentane, hexane, heptane, octane, nonane, decane, or higher hydrocarbons. The term "black oil" refers to the class of crude oil typically having gas-oil ratios (GOR) less than about 2000 scf/stb (356 $m^3/m^3$). For example, a black oil may have a GOR in a range from about 100 (18), 200 (36), 300 (53), 400 (71), or even 500 scf/stb (89 $m^3/m^3$) up to about 1800 (320), 1900 (338), or 2000 scf/stb (356 $m^3/m^3$). The term "volatile oil" refers to the class of crude oil typically having a GOR in a range between about 2000 and 3300 scf/stb (356 and 588 $m^3/m^3$). For example, a volatile oil may have a GOR in a range from about 2000 (356), 2100 (374), or 2200 scf/stb (392 $m^3/m^3$) up to about 3100 (552), 3200 (570), or 3300 scf/stb (588 $m^3/m^3$). In some embodiments, the solvent (in the composition) at least partially solubilizes or at least partially displaces the liquid hydrocarbons in the hydrocarbon-bearing formation.

Generally, for the treatment methods disclosed herein, the amounts of the fluorinated polymer and solvent (and type of solvent) is dependent on the particular application since conditions typically vary between wells, at different depths of individual wells, and even over time at a given location in an individual well. Advantageously, treatment methods according to the present disclosure can be customized for individual wells and conditions.

Methods of making a composition according to the present disclosure include receiving (e.g., obtaining or measuring) data comprising the temperature and at least one of the hydrocarbon composition or the brine composition (including the brine saturation level and components of the brine) of a selected geological zone of a hydrocarbon-bearing formation. These data can be obtained or measured using techniques well known to one of skill in the art. The methods of making a composition disclosed herein also include generating a formulation based at least in part on compatibility information concerning the fluorinated polymer, the solvent, the temperature, and at least one of the hydrocarbon composition or brine composition of the selected geological zone of the formation. In some embodiments, the compatibility information comprises information concerning phase stability of a mixture of the fluorinated polymer, the solvent, and a model brine composition, wherein the model brine composition is based at least partially on the brine composition of the geological zone of the formation. The phase stability of a solution or dispersion can be evaluated using the phase behavior evaluation described above. The phase behavior of the composition and the brine can be evaluated over an extended period of time (e.g., 1 hour, 12 hours, 24 hours, or longer) to determine if any phase separation, precipitation, or cloudiness is observed.

In some embodiments, the compatibility information comprises information concerning solid (e.g., salts or asphaltenes) precipitation from a mixture of the fluorinated polymer, the solvent, a model brine composition, and a model hydrocarbon composition, wherein the model brine composition is based at least partially on the brine composition of the geological zone of the formation, and wherein the model hydrocarbon composition is based at least partially on the hydrocarbon composition of the geological zone of the formation.

In additional to using a phase behavior evaluation, it is also contemplated that one may be able obtain the compatibility information, in whole or in part, by computer simulation or by referring to previously determined, collected, and/or tabulated information (e.g., in a handbook or a computer database).

The hydrocarbon-bearing formations that may be treated according to the present disclosure may be siliciclastic (e.g., shale, conglomerate, diatomite, sand, and sandstone) or carbonate (e.g., limestone or dolomite) formations. Typically, compositions and methods according to the present disclosure can be used to treat siliciclastic formations. In some embodiments, the hydrocarbon-bearing formation is predominantly sandstone (i.e., at least 50 percent by weight sandstone). Carbonate formations (e.g., limestone) that may be treated according to the present disclosure may be fractured formations in which the fracture contains proppants.

Methods according to the present disclosure may be practiced, for example, in a laboratory environment (e.g., on a core sample (i.e., a portion) of a hydrocarbon-bearing formation or in the field (e.g., on a subterranean hydrocarbon-bearing formation situated downhole). Typically, the methods disclosed herein are applicable to downhole conditions having a pressure in a range from about 1 bar (100 kPa) to about 1000 bars (100 MPa) and have a temperature in a range from about 100° F. (37.8° C.) to 400° F. (204° C.) although the methods are not limited to hydrocarbon-bearing formations having these conditions. Those skilled in the art, after reviewing the instant disclosure, will recognize that various factors may be taken into account in practice of the any of the disclosed methods including the ionic strength of the brine, pH (e.g., a range from a pH of about 4 to about 10), and the radial stress at the wellbore (e.g., about 1 bar (100 kPa) to about 1000 bars (100 MPa)).

In the field, treating a hydrocarbon-bearing formation with a composition described herein can be carried out using methods (e.g., by pumping under pressure) well known to those skilled in the oil and gas art. Coil tubing, for example, may be used to deliver the treatment composition to a particular geological zone of a hydrocarbon-bearing formation. In some embodiments of practicing the methods described herein it may be desirable to isolate a geological zone (e.g., with conventional packers) to be treated with the composition.

Methods of using compositions described herein are useful, for example on both existing and new wells. Typically, it is believed to be desirable to allow for a shut-in time after compositions described herein are treated with the hydrocarbon-bearing formations. Exemplary shut-in times include a few hours (e.g., 1 to 12 hours), about 24 hours, or even a few (e.g., 2 to 10) days. After the composition has been allowed to remain in place for a selected time, the solvents present in the composition may be recovered from the formation by simply pumping fluids up tubing in a well as is commonly done to produce fluids from a formation.

In some embodiments of treatment methods according to the present disclosure, the method comprises treating the hydrocarbon-bearing formation with a fluid prior to treating the hydrocarbon-bearing formation with the composition. In some embodiments, the fluid at least one of at least partially solubilizes or at least partially displaces the brine in the hydrocarbon-bearing formation. In some embodiments, the fluid at least partially solubilizes the brine. In some embodiments, the fluid at least partially displaces the brine. In some embodiments, the fluid at least one of at least partially solubilizes or displaces liquid hydrocarbons in the hydrocarbon-bearing formation. In some embodiments, the fluid is substantially free of fluorinated polymers. The term "substantially free of fluorinated polymers" refers to fluid that may have a fluorinated polymer in an amount insufficient for the fluid to have a cloud point (e.g., when it is below its critical micelle concentration). A fluid that is substantially free of fluorinated polymers may be a fluid that has a fluorinated polymer but in an amount insufficient to alter the wettability of, for example, a hydrocarbon-bearing formation under downhole conditions. A fluid that is substantially free of fluorinated polymers includes those that have a weight percent of such polymers as low as 0 weight percent. The fluid may be useful for decreasing the concentration of at least one of the salts present in the brine prior to introducing the composition to the hydrocarbon-bearing formation. The change in brine composition may change the results of a phase behavior evaluation (e.g., the combination of a composition with a first brine prior to the fluid preflush may result in phase separation or salt precipitation while the combination of the composition with the brine after the fluid preflush may result in no phase separation or salt precipitation.)

In some embodiments of treatment methods disclosed herein, the fluid comprises at least one of toluene, diesel, heptane, octane, or condensate. In some embodiments, the fluid comprises at least one of water, methanol, ethanol, or isopropanol. In some embodiments, the fluid comprises at least one of a polyol or polyol ether independently having from 2 to 25 carbon atoms. In some embodiments, useful polyols have 2 to 20, 2 to 15, 2 to 10, 2 to 8, or 2 to 6 carbon atoms. Exemplary useful polyols include ethylene glycol, propylene glycol, polypropylene glycol), 1,3-propanediol, trimethylolpropane, glycerol, pentaerythritol, and 1,8-octanediol. In some embodiments, useful polyol ethers may have from 3 to 25 carbon atoms, 3 to 20, 3 to 15, 3 to 10, 3 to 8, or from 5 to 8 carbon atoms. Exemplary useful polyol ethers include diethylene glycol monomethyl ether, ethylene glycol monobutyl ether, dipropylene glycol monomethyl ether, 2-butoxyethanol, and 1-methoxy-2-propanol. In some embodiments, the fluid comprises at least one monohydroxy alcohol, ether, or ketone independently having up to four carbon atoms. In some embodiments, the fluid comprises at least one of nitrogen, carbon dioxide, or methane.

In some embodiments of the treatment methods and articles disclosed herein, the hydrocarbon-bearing formation has at least one fracture. In some embodiments, fractured formations have at least 2, 3, 4, 5, 6, 7, 8, 9, or 10 or more fractures. As used herein, the term "fracture" refers to a fracture that is man-made. In the field, for example, fractures are typically made by injecting a fracturing fluid into a subterranean geological formation at a rate and pressure sufficient to open a fracture therein (i.e., exceeding the rock strength).

In some embodiments of the treatment methods disclosed herein, wherein treating the formation with the composition provides an increase in at least one of the gas permeability or the liquid permeability of the formation, the formation is a non-fractured formation (i.e., free of man-made fractures). Advantageously, treatment methods disclosed herein typically provide an increase in at least one of the gas permeability or the hydrocarbon liquid permeability of the formation without fracturing the formation.

In some embodiments of the treatment methods and articles disclosed herein, wherein the hydrocarbon-bearing formation has at least one fracture, the fracture has a plurality of proppants therein. Prior to delivering the proppants into a fracture, the proppants may be treated with a fluorinated polymer or may be untreated (e.g., may comprise less than 0.1% by weight fluorinated polymer, based on the total weight of the plurality of proppants). In some embodiments, the fluorinated polymer according to and/or useful in practicing the present disclosure is adsorbed on at least a portion of the plurality of proppants.

Exemplary proppants known in the art include those made of sand (e.g., Ottawa, Brady or Colorado Sands, often referred to as white and brown sands having various ratios), resin-coated sand, sintered bauxite, ceramics (i.e., glasses, crystalline ceramics, glass-ceramics, and combinations thereof), thermoplastics, organic materials (e.g., ground or crushed nut shells, seed shells, fruit pits, and processed wood), and clay. Sand proppants are available, for example, from Badger Mining Corp., Berlin, Wis.; Borden Chemical, Columbus, Ohio; and Fairmont Minerals, Chardon, Ohio. Thermoplastic proppants are available, for example, from the Dow Chemical Company, Midland, Mich.; and BJ Services, Houston, Tex. Clay-based proppants are available, for example, from CarboCeramics, Irving, Tex.; and Saint-Gobain, Courbevoie, France. Sintered bauxite ceramic proppants are available, for example, from Borovichi Refractories, Borovichi, Russia; 3M Company, St. Paul, Minn.; CarboCeramics; and Saint Gobain. Glass bubble and bead proppants are available, for example, from Diversified Industries, Sidney, British Columbia, Canada; and 3M Company.

In some embodiments of methods of treating fractured formations, the proppants form packs within a formation and/or wellbore. Proppants may be selected to be chemically compatible with the solvents and compositions described herein. The term "proppant" as used herein includes fracture proppant materials introducible into the formation as part of a hydraulic fracture treatment and sand control particulate introducible into the wellbore/formation as part of a sand control treatment such as a gravel pack or frac pack.

In some embodiments, methods according to the present disclosure include treating the hydrocarbon-bearing formation with the composition at least one of during fracturing or after fracturing the hydrocarbon-bearing formation.

In some embodiments of methods of treating fractured formations, the amount of the composition introduced into the fractured formation is based at least partially on the volume of the fracture(s). The volume of a fracture can be measured using methods that are known in the art (e.g., by pressure transient testing of a fractured well). Typically, when a fracture is created in a hydrocarbon-bearing subterranean formation, the volume of the fracture can be estimated using at least one of the known volume of fracturing fluid or the known amount of proppant used during the fracturing operation. Coil tubing, for example, may be used to deliver the treatment composition to a particular fracture. In some embodiments, in practicing the methods disclosed herein it may be desirable to isolate the fracture (e.g., with conventional packers) to be treated with the treatment composition.

In some embodiments, wherein the formation treated according to the methods described herein has at least one fracture, the fracture has a conductivity, and after the composition treats at least one of the fracture or at least a portion of the plurality of proppants, the conductivity of the fracture is increased (e.g., by 25, 50, 75, 100, 125, 150, 175, 200, 225, 250, 275, or by 300 percent).

In some embodiments of treated particles (e.g., proppants) according to the present disclosure, these particles collectively have particles in a range from 100 micrometers to 3000 micrometers (i.e., about 140 mesh to about 5 mesh (ANSI)) (in some embodiments, in a range from 1000 micrometers to 3000 micrometers, 1000 micrometers to 2000 micrometers, 1000 micrometers to 1700 micrometers (i.e., about 18 mesh to about 12 mesh), 850 micrometers to 1700 micrometers (i.e., about 20 mesh to about 12 mesh), 850 micrometers to 1200 micrometers (i.e., about 20 mesh to about 16 mesh), 600 micrometers to 1200 micrometers (i.e., about 30 mesh to about 16 mesh), 425 micrometers to 850 micrometers (i.e., about 40 to about 20 mesh), or 300 micrometers to 600 micrometers (i.e., about 50 mesh to about 30 mesh).

Typically for making treated particles (e.g., proppants) according to the present disclosure, the fluorinated polymer is dissolved or dispersed in a dispersing medium (e.g., water and/or organic solvent (e.g., alcohols, ketones, esters, alkanes and/or fluorinated solvents (e.g., hydrofluoroethers and/or perfluorinated carbons)) that is then applied to the particles. Optionally, a Lewis Acid catalyst can be added. The amount of liquid medium used should be sufficient to allow the solution or dispersion to generally evenly wet the particles being treated. Typically, the concentration of the fluorinated polymer in the solution/dispersion solvent is the range from about 5% to about 20% by weight, although amounts outside of this range may also be useful. The particles are typically treated with the fluorinated polymer solution/dispersion at temperatures in the range from about 25° C. to about 50° C., although temperatures outside of this range may also be useful. The treatment solution/dispersion can be applied to the particles using techniques known in the art for applying solutions/dispersions to particles (e.g., mixing the solution/dispersion and particles in a vessel (in some embodiments under reduced pressure) or spraying the solutions/dispersions onto the particles). After application of the treatment solution/dispersion to the particles, the liquid medium can be removed using techniques known in the art (e.g., drying the particles in an oven). Typically, about 0.1 to about 5 (in some embodiments, for example, about 0.5 to about 2) percent by weight fluorinated polymer is added to the particles, although amounts outside of this range may also be useful.

For methods of fracturing a hydrocarbon-bearing formation according to the present disclosure, the hydraulic fluid and/or the fluid comprising the plurality of proppants may be aqueous (e.g., a brine) or may contain predominantly organic solvent (e.g., an alcohol or a hydrocarbon). In some embodiments, it may be desirable for one or both of the fluids to include contain viscosity enhancing agents (e.g., polymeric viscosifiers), electrolytes, corrosion inhibitors, scale inhibitors, and other such additives that are common to a fracturing fluid.

Referring to FIG. 1, an exemplary offshore oil platform is schematically illustrated and generally designated 10. Semi-submersible platform 12 is centered over submerged hydrocarbon-bearing formation 14 located below sea floor 16. Subsea conduit 18 extends from deck 20 of platform 12 to wellhead installation 22 including blowout preventers 24. Platform 12 is shown with hoisting apparatus 26 and derrick 28 for raising and lowering pipe strings such as work string 30.

Wellbore 32 extends through the various earth strata including hydrocarbon-bearing formation 14. Casing 34 is cemented within wellbore 32 by cement 36. Work string 30 may include various tools including, for example, sand control screen assembly 38 which is positioned within wellbore 32 adjacent to hydrocarbon-bearing formation 14. Also extending from platform 12 through wellbore 32 is fluid delivery tube 40 having fluid or gas discharge section 42 positioned adjacent to hydrocarbon-bearing formation 14, shown with production zone 48 between packers 44, 46. When it is desired to treat the near-wellbore region of hydrocarbon-bearing formation 14 adjacent to production zone 48, work string 30 and fluid delivery tube 40 are lowered through casing 34 until sand control screen assembly 38 and fluid discharge section 42 are positioned adjacent to the near-wellbore region of hydrocarbon-bearing formation 14 including perforations 50. Thereafter, a composition described herein is pumped down delivery tube 40 to progressively treat the near-wellbore region of hydrocarbon-bearing formation 14.

While the drawing depicts an offshore operation, the skilled artisan will recognize that the methods for treating a production zone of a wellbore are equally well-suited for use in onshore operations. Also, while the drawing depicts a vertical well, the skilled artisan will also recognize that methods according to the present disclosure are equally well-suited for use in deviated wells, inclined wells or horizontal wells.

Fluorinated polymers according to the present disclosure may also be useful, for example, as industrial coating additives due to their surfactant properties. The fluorinated polymers disclosed herein may provide better wetting and/or leveling of a coating to a substrate surface or better dispersability of a component (e.g., a thickening agent or pigment) within the coating formulation. Many industrial coating formulations typically include at least one polymeric material (e.g., a film-forming polymer) and at least one of water or solvent (e.g., methyl ethyl ketone and 1-methoxy-2-propanol). When a coating formulation is applied to a substrate, solvent evaporates, and the polymer particles coalesce to form a continuous film. Coating formulations are typically applied, dried, and optionally heated, leaving the finished product with a solid coating. The addition of fluorinated polymers according to the present invention may improve the film forming properties of some formulations by improving the ability of the coating to wet the substrate and/or by allowing for even evaporation of water and/or solvent (i.e., leveling) during film formation.

Advantages and embodiments of the methods disclosed herein are further illustrated by the following examples, but the particular materials and amounts thereof recited in these examples, as well as other conditions and details, should not be construed to unduly limit this disclosure. Unless otherwise noted, all parts, percentages, ratios, etc. in the examples and the rest of the specification are by weight. In the Tables, "nd" means not determined.

EXAMPLES

In the following Examples, MeFBSEA was made according to the method of U.S. Pat. No. 6,664,354 (Savu), Example 2, Parts A and B, except using 4270 kilograms (kg) of N-methylperfluorobutanesulfonamidoethanol, 1.6 kg of phenothiazine, 2.7 kg of methoxyhydroquinone, 1590 kg of heptane, 1030 kg of acrylic acid, 89 kg of methanesulfonic acid (instead of triflic acid), and 7590 kg of water in Part B.

In the following Examples, 3,3,4,4,5,5,6,6,7,7,8,8,8-tridecafluorooctyl acrylate (FOA) was prepared according to the following method. To a 500-mL round bottom flask were added 100 grams (0.275 moles) of 1H,1H,2H,2H-perfluorooctan-1-ol ($C_6F_{13}C_2H_4OH$) (obtained from Clariant Chemical Co., Mount Holly, N.C., under the trade designation "FLUOWET EA600"), 19.8 grams (0.275 moles) of acrylic acid (obtained from Sigma-Aldrich, St. Louis, Mo.), 250 grams of heptane, and 1 gram of methane sulfonic acid, and the mixture was heated at reflux for 15 hours. Water was collected (about 4.9 to 5 grams) using a Dean-Stark trap. The temperature was reduced to 70° C., and 1.1 gram of triethanol amine was added to the flask and allowed to mix for 30 minutes. A solid was present and removed by filtration. Heptane was removed from the filtrate under reduced pressure. A white precipitate was present in the resulting liquid, which was filtered out using a glass filter paper. A clear liquid was obtained which by infrared spectroscopy showed a peak at 1637 $cm^{-1}$.

Examples 1 to 5

Into each of five 4-ounce (0.1 liter) pressure bottles was placed N,N-dimethylaminoethyl acrylate methyl chloride quaternary (DMAEAMCl) (obtained as a 80% by weight solution in water from Ciba Specialty Chemicals, Basel, Switzerland, under the trade designation "CIBA AGEFLEX FA1Q80MC") in an amount shown in Table 2, below.

TABLE 2

| Example | MeFBSEA, grams | DMAEAMCl (80%), grams | MeFBSEA: DMAEAMCl mole:mole (w/w) | Grams lost, % of total | Polymer percent solids |
| --- | --- | --- | --- | --- | --- |
| 1 | 8.2 | 6.4 | 43:57 (62:38) | 10.1, 18.4% | 27.4 |
| 2 | 8.2 | 5.6 | 46:54 (65:35) | 9.6, 17.5% | 26.6 |

TABLE 2-continued

| Example | MeFBSEA, grams | DMAEAMCl (80%), grams | MeFBSEA: DMAEAMCl mole:mole (w/w) | Grams lost, % of total | Polymer percent solids |
|---|---|---|---|---|---|
| 3 | 8.2 | 4.8 | 50:50 (68:32) | 19.4, 38.2% | 25.6 |
| 4 | 8.2 | 4.0 | 55:45 (72:28) | 9.8, 18.7% | 24.8 |
| 5 | 8.2 | 3.2 | 60:40 (76:24) | 10.7, 18.4% | 23.8 |

A solution of 49.3 grams MeFBSEA, 3.0 grams 3-mercapto-1,2-propanediol, and 0.6 gram of 2,2'-azobis(2-methylbutyronitrile) in 216 grams of 1:1 weight/weight (w/w) methyl ethyl ketone and methanol was prepared. 44.8 grams of this solution was added to each bottle to provide 8.2 grams MeFBSEA, 0.5 gram 3-mercapto-1,2-propanediol, 0.1 gram of 2,2'-azobis(2-methylbutyronitrile), and 36 grams of solvent in each bottle. The bottles were degassed for 1 minute with nitrogen at one liter per minute and then heated under a nitrogen atmosphere for about 3.5 days at 60° C. in a rotating water bath. The molar and weight ratios of MeFBSEA and DMAEAMCl are given in Table 2, above.

During the polymerization process, each of the 5 bottles leaked, and the final weight of the samples was measured at the end of the reaction time. Because the solutions were homogeneous before and after the polymerization, loss of some liquid is not thought to alter the ratios of components in the remaining liquid. The loss in grams is given in Table 2, above. The percent of solids was determined for each Example by heating an approximately one-gram sample in a vented oven for two hours at 105° C. The percent solids for each Example is given in Table 2, above.

Examples 6 and 7

Examples 6 and 7 were prepared according to the method of Examples 1 to 5 except using 30 grams of the solvent mixture and using the amounts of the reagents and the molar and weight ratios given in Table 3, below.

TABLE 3

| Example | MeFBSEA, grams | DMAEAMCl (80%), grams | MeFBSEA: DMAEAMCl mole:mole (w/w) | Grams lost, % of total input | Polymer percent solids |
|---|---|---|---|---|---|
| 6 | 4.0 | 7.5 | 24:76 (40:60) | 1.9, 3.2% | 26.3 |
| 7 | 2.0 | 10.0 | 11:89 (20:80) | 4.2, 2.8% | 28.1 |

The grams lost during the polymerization and the percent solids of the resulting polymer are given in Table 3, above.

Examples 8 to 11

Into each of five 4-ounce (0.1 liter) pressure bottles was placed DMAEAMCl (obtained as a 80% by weight solution in water from Ciba Specialty Chemicals) under the trade designation "CIBA AGEFLEX FA1Q80MC") and MeFBSEA or FOA in amounts shown in Table 4, below. For Examples 8 and 9, a batch of 90 grams methanol, 90 grams methyl ethyl ketone, 3 grams 3-mercapto-1,2-propanediol, and 0.60 gram of 2,2'-azobis(2-methylbutyronitrile) was prepared. For Examples 10 and 11, a batch of 45 grams methanol, 45 grams methyl ethyl ketone, 1.5 grams 3-mercapto-1,2-propanediol, and 0.30 gram of 2,2'-azobis(2-methylbutyronitrile) was prepared. 30.6 grams of the respective batch was added to each bottle to provide 0.5 gram 3-mercapto-1,2-propanediol, 0.1 gram of 2,2'-azobis(2-methylbutyronitrile), 15 grams of methanol and 15 grams of methyl ethyl ketone to each bottle. The bottles were degassed for 1 minute with nitrogen at one liter per minute and then heated under a nitrogen atmosphere for about 24 hours at 60° C. in a rotating water bath. The molar and weight ratios of fluorinated monomer and DMAEAMCl are given in Table 4, below.

TABLE 4

| Example | Fluorinated monomer, grams | DMAEAMCl (80%), grams | Fluorinated monomer:DMAEAMCl mole:mole (w/w) |
|---|---|---|---|
| 8 | MeFBSEA, 8.22 | 4.8 | 50:50 (68:32) |
| 9 | MeFBSEA, 4.0 | 7.5 | 24:76 (40:60) |
| 10 | FOA, 2.0 | 10.0 | 10:90 (20:80) |
| 11 | FOA, 4.0 | 7.5 | 24:76 (40:60) |

Illustrative Examples 12 and 13

Into each of five 4-ounce (0.1 liter) pressure bottles was placed DMAEAMCl (obtained as a 80% by weight solution in water from Ciba Specialty Chemicals) under the trade designation "CIBA AGEFLEX FA1Q80MC") and a perfluoroalkylethyl acrylate with 8 to 10 fluorinated carbons (FOEA) (obtained from Hoechst, Frankfurt, Germany under the trade designation "FLUOWET AC-812") in amounts shown in Table 5, below. A batch of 90 grams methanol, 90 grams methyl ethyl ketone, 3 grams 3-mercapto-1,2-propanediol, and 0.60 gram of 2,2'-azobis(2-methylbutyronitrile) was prepared. 30.6 grams of the batch was added to each bottle to provide 0.5 gram 3-mercapto-1,2-propanediol, 0.1 gram of 2,2'-azobis(2-methylbutyronitrile), 15 grams of methanol and 15 grams of methyl ethyl ketone to each bottle. The bottles were degassed for 1 minute with nitrogen at one liter per minute and then heated under a nitrogen atmosphere for about 24 hours at 60° C. in a rotating water bath. The molar and weight ratios of fluorinated monomer and DMAEAMCl are given in Table 5, below.

TABLE 5

| Illustrative Example | FOEA, grams | DMAEAMCl (80%), grams | Fluorinated monomer:DMAEAMCl mole:mole (w/w) |
|---|---|---|---|
| 12 | 2.0 | 10.0 | 8:92 (20:80) |
| 13 | 4.0 | 7.5 | 18:82 (40:60) |

Illustrative Examples 12 and 13 were used for the core flood evaluations of Illustrative Examples 16 and 17. A repeat of the method of Illustrative Examples 12 and 13 was used to prepare samples for dynamic surface tension measurements.

Brine

Water (92.25%), 5.9% sodium chloride, 1.6% calcium chloride, 0.23% magnesium chloride hexahydrate, and 0.05% potassium chloride were combined to provide the brine used in the Compatibility Evaluations and the Core Flood Examples.

Comparative Materials

Comparative fluorinated surfactant A was a cationic water-dilutable fluoropolymer for porous surface treatments obtained from E. I. du Pont de Nemours and Co., Wilmington, Del. under the trade designation "ZONYL 8740".

Comparative fluorinated surfactant B was a cationic fluorinated surfactant represented by formula $C_8F_{17}SO_2NH(CH_2)_3N+(CH_3)_3I$— obtained as a 50% by weight solution in isopropanol from 3M Company, St. Paul, Minn. under the trade designation "FC135".

The comparative materials were used in Compatibility Evaluations VIII and IX and in Core Flood Comparative Examples A and B.

Compatibility Evaluations I to VII

A fluorinated polymer or comparative material and solvents (Solvent A and Solvent B) were added to a vial to prepare a sample (3 grams total amount, 2% w/w of fluorinated polymer). Brine was added in 0.25 gram increments to the vial, and the vial was placed in a heated bath at 135° C. for 15 minutes. The vial was removed from the bath, and then visually inspected immediately to determine whether the sample was one phase. If the sample was one phase, the brine addition and heating steps were repeated until the sample was no longer one phase.

The Example used for each compatibility evaluation and initial percentages of solvents are shown in Table 6, below, wherein the indicated weight percentages of brine are based on the combined total weight of the solvents, brine, and fluorinated polymer.

The amount of brine that was compatible in the mixture (before phase separation occurred) is shown in Table 6, below. For evaluations with a brine weight percent of >50%, 50% by weight of the brine was added to the composition, no phase separation occurred, and the test was stopped.

TABLE 6

| Evaluation | Fluorinated Polymer | Solvent A (weight %) | Solvent B (weight %) | Brine, wt. % |
|---|---|---|---|---|
| I | Example 1 | Propylene glycol (PG) (69) | Isopropanol (IPA) (29) | >50% |
| II | Example 2 | PG (69) | IPA (29) | >50% |
| III | Example 3 | PG (69) | IPA (29) | >50% |
| IV | Example 4 | PG (69) | IPA (29) | >50% |
| V | Example 5 | PG (69) | IPA (29) | 33% |
| VI | Example 6 | PG (69) | IPA (29) | >50% |
| VII | Example 7 | PG (69) | IPA (29) | >50% |

Compatibility Evaluation of Comparative Materials A and B and Illustrative Examples 12 and 13.

For a compatibility evaluation of Comparative Materials A and B and Illustrative Example 13, the method of Compatibility Evaluations I to VII was followed except that 1 gram of brine was added a vial containing 3 grams of a 2% solution of cationic surfactant in 70/30 propylene glycol/isopropanol all at once. For each of these compatibility evaluations, the sample was visually observed and determined to be one phase.

For Illustrative Example 12, a mixture of 2% by weight of the fluorinated polymer, 69% by weight of propylene glycol, and 29% by weight isopropanol was hazy before any brine was added. When the Compatibility Evaluation was carried out by adding 1 gram of brine to a 2% solution of Illustrative Example 12, 59% propylene glycol, and 39% isopropanol, the sample was visually determined to be one phase.

Core Flood Examples 14 and 15, Comparative Examples A, B, and C, and Illustrative Examples 16 and 17

Composition Preparation:

A fluorinated polymer or comparative material and two solvents (Solvent A and Solvent B) were combined to make 600 grams of a 2% by weight solution of the fluorinated polymer. The components were mixed together using a magnetic stirrer and magnetic stir bar. The fluorinated polymer, solvents, and amounts (in wt. % based on the total weight of the composition) used for Examples 14 and 15, Comparative Examples A to C, and Illustrative Examples 16 and 17 are shown in Table 7, below.

TABLE 7

| Core Flood Example | Fluorinated Polymer | Solvent A | Solvent B |
|---|---|---|---|
| 14 | Example 3 (2) | PG (69) | IPA (29) |
| 15 | Example 6 (2) | PG (69) | IPA (29) |
| Comp. Ex. A | A (2) | PG (69) | IPA (29) |
| Comp. Ex. B | B (2) | PG (69) | IPA (29) |
| Comp. Ex. C | none | PG (70) | IPA (30) |
| Illustrative Ex. 16 | Ill. Ex. 12 (2) | PG (59) | IPA (39) |
| Illustrative Ex. 17 | Ill. Ex. 13 (2) | PG (69) | IPA (29) |

Figure 2:
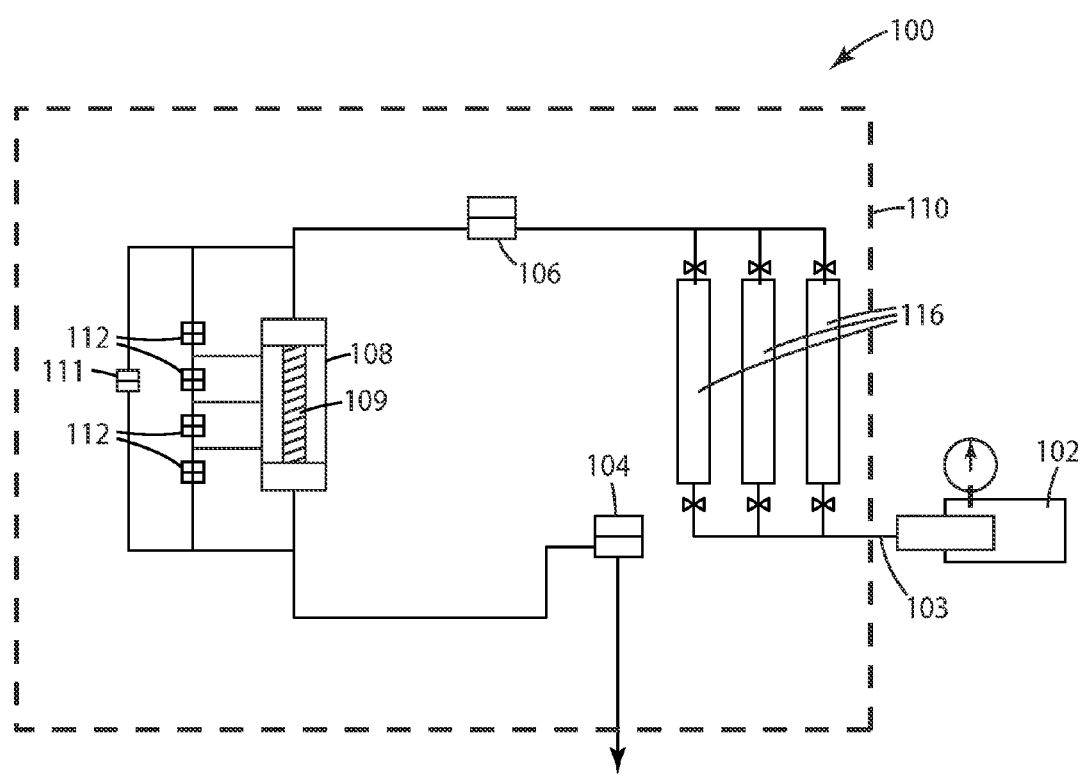
FIG. 2 is a schematic illustration of the core flood set-up used for Examples 14 and 15, Comparative Examples A to C, and Illustrative Examples 16 and 17.

Core Flood Setup:

A schematic diagram of a core flood apparatus 100 used to determine relative permeability of a substrate sample (i.e., core) is shown in FIG. 2. Core flood apparatus 100 included positive displacement pumps (Model No. 1458; obtained from General Electric Sensing, Billerica, Mass.) 102 to inject fluid 103 at constant rate into fluid accumulators 116. Multiple pressure ports 112 on high-pressure core holder 108 (Hassler-type Model UTPT-1x8-3K-13 obtained from Phoenix, Houston Tex.) were used to measure pressure drop across four sections (2 inches in length each) of core 109. An additional pressure port 111 on core holder 108 was used to measure pressure drop across the entire length (8 inches) of core 109. Two back-pressure regulators (Model No. BPR-50; obtained from Temco, Tulsa, Okla.) 104, 106 were used to control the flowing pressure upstream 106 and downstream 104 of core 109.

The flow of fluid was through a vertical core to avoid gravity segregation of the gas. High-pressure core holder 108, back pressure regulators 106, fluid accumulators 116, and tubing were placed inside a pressure- and temperature-controlled oven 110 (Model DC 1406F; maximum temperature rating of 650° F. (343° C.) obtained from SPX Corporation, Williamsport, Pa.) at 275° F. (135° C.). The maximum flow rate of fluid was 7,000 mL/hr.

Cores:

A core sample was cut from a sandstone block obtained from Cleveland Quarries, Vermillion, Ohio, under the trade designation "BEREA SANDSTONE". One core was used for each of Examples 14 and 15, Comparative Examples A to C, and Illustrative Examples 16 and 17. The properties for each of the cores used are shown in Table 8, below.

TABLE 8

|  | Ex. 14 | Ex. 15 | C.E. A | C.E. B | C.E. C | Ill. Ex. 16 | Ill. Ex. 17 |
|---|---|---|---|---|---|---|---|
| Diameter, cm | 2.5 | 2.5 | 2.5 | 2.6 | 2.6 | 2.5 | 2.5 |
| Length, cm | 14.2 | 14.5 | 14.6 | 14.6 | 14.6 | 14.6 | 14.6 |
| Pore volume, mL | 13.6 | 13.5 | 13.4 | 14.6 | 15.2 | 13.4 | 13.2 |
| Porosity, % | 19.0 | 19.0 | 19.0 | 19.4 | 19.4 | 19.0 | 19.0 |

The porosity was measured using a gas expansion method. The pore volume is the product of the bulk volume and the porosity.

Synthetic Condensate Composition:

A synthetic gas-condensate fluid containing 93 mole percent methane, 4 mole percent n-butane, 2 mole percent n-decane, and 1 mole percent n-pentadecane was used for the core flooding evaluation. Approximate values for various properties of the fluid are reported Table 9, below.

TABLE 9

| Dewpoint, psig (Pa) | 4200 (2.9 × $10^7$) |
|---|---|
| Core pressure, psig (Pa) | 1500 (1.0 × $10^7$) |
| Liquid dropout, V/Vt % | 3.2 |
| Gas viscosity, cP | 0.017 |
| Oil viscosity, cP | 0.22 |
| Interfacial tension, dynes/cm | 5.0 |

Core Flood Procedure:

The cores described in Table 8 were dried for 72 hours in a standard laboratory oven at 95° C., and then were wrapped in aluminum foil and heat shrink tubing (obtained under the trade designation "TEFLON HEAT SHRINK TUBING" from Zeus, Inc., Orangeburg, S.C.). Referring again to FIG. 2, the wrapped core 109 was placed in core holder 108 inside oven 110 at 75° F. (24° C.). An overburden pressure of 3400 psig (2.3×$10^7$ Pa) was applied. The initial single-phase gas permeability was measured using nitrogen at a flowing pressure of 1200 psig (8.3×$10^6$ Pa).

The brine was introduced into the core 109 by the following procedure to establish a brine saturation of 26% (i.e., 26% of the pore volume of the core was saturated with brine). The outlet end of the core holder was connected to a vacuum pump and a full vacuum was applied for 30 minutes with the inlet closed. The inlet was connected to a burette with the brine in it. The outlet was closed and the inlet was opened to allow a known volume of brine to flow into the core. For example, a 26% brine saturation was established by allowing 5.3 mL of brine to flow into the core having a pore volume of 20 mL before the inlet value was closed. The permeability was measured at the water saturation by flowing nitrogen at 1200 psig and 75° F. (24° C.).

Referring again to FIG. 2, the wrapped core 109 in the core holder 108 was placed inside oven 110 at 275° F. (135° C.) for several hours. The synthetic gas-condensate fluid described above was then introduced at a flow rate of about 690 mL/hr until steady state was established. Upstream back-pressure regulator 106 was set at about 4900 psig (3.38×$10^7$ Pa), above the dew point pressure of the fluid, and downstream back-pressure regulator 104 was set at about 1500 psig (3.38×$10^7$ Pa). The gas relative permeability before treatment was then calculated from the steady state pressure drop after about 200 pore volumes were injected. The fluorinated polymer composition was then injected into the core. After at least 20 pore volumes were injected, the surfactant composition was held in the core at 275° F. (135° C.) for about 15 hours. The synthetic gas condensate fluid described above was then introduced again at a flow rate of about 690 mL/hour using positive displacement pump 102 until a steady state was reached (about 150 to 200 pore volumes). The gas relative permeability after treatment was then calculated from the steady state pressure drop. For Examples 14 and 15, Illustrative Example 16, and Comparative Examples B and C, the core was allowed to stand in the presence of the synthetic condensate compositions for 24 hours before a second core flood was run.

Following the relative permeability measurements, methane gas was injected, using positive displacement pump 102, to displace the condensate and measure the final single-phase gas permeability.

For Examples 14 and 15, Comparative Examples A to C, and Illustrative Examples 16 and 17, the initial single-phase gas permeability, measured after brine saturation, the gas relative permeability before treatment with the fluorinated material composition, the gas relative permeability after treatment (at the times indicated above), the ratio of the gas relative permeabilities after and before treatment (i.e., improvement factor) are reported in Table 10, below. For Illustrative Examples 16 and 17, the compositions were observed to foam after they were flooded through the cores.

TABLE 10

|  | Example 14 | Example 15 | Comp. Ex. A | Comp. Ex. B | Comp. Ex. C | Ill. Ex. 16 | Ill. Ex. 17 |
|---|---|---|---|---|---|---|---|
| Gas permeability, millidarcy (md) | 157.5 | 170.2 |  | 348.6 | 357.5 | 94.0 | 164.6 |
| Gas relative permeability before treatment | 0.067 | 0.058 | 0.068 | 0.065 | 0.069 | 0.067 | 0.069 |
| Gas relative permeability after treatment | 0.114/0.109 | 0.101/0.098 | plugged | 0.125/0.115 | 0.115/0.099 | 0.096/0.084 | 0.091 |
| Improvement factor | 1.70/1.63 | 1.74/1.69 |  | 1.92/1.77 | 1.67/1.43 | 1.4/1.2 | 1.3 |

Dynamic Surface Tension Measurements

The dynamic surface tensions of Examples 8 to 11 and Illustrative Examples 12 and 13 were measured on a Kruss bubble pressure tensiometer (obtained from Kruss USA, Charlotte, N.C., under the trade designation "KRUSS BUBBLE PRESSURE TENSIOMETER BP2"). Surface tension vs. surface age was measured for each Example and Illustrative Example, and the results are shown in Table 11, below.

TABLE 11

| Liquid | Example | Surface Age (ms) | | | | | |
|---|---|---|---|---|---|---|---|
| | | 10 | 20 | 50 | 100 | 500 | 1000 |
| | | Surface Tension mN/m | | | | | |
| water | none | 72 | 72 | 72 | 72 | 72 | 72 |
| | 8 | 66 | 65 | 63 | 62 | 56 | 52 |
| | 9 | 64 | 63 | 62 | 61 | 55 | 51 |
| | 10 | 64 | 63 | 62 | 61 | 58 | 56 |
| | 11 | 64 | 63 | 62 | 61 | 55 | 51 |
| | Ill. Ex. 12 | 66 | 65 | 64 | 63 | 63 | 63 |
| | Ill. Ex. 13 | 68 | 68 | 67 | 66 | 65 | 65 |
| Propylene glycol/ isopropanol (70/30) | none | 42 | 48 | 45 | 43 | 40 | 37 |
| | 9 | 40 | 38 | 41 | 40 | 38 | 36 |
| | 10 | 46 | 43 | 45 | 45 | 41 | 39 |
| | 11 | 43 | 40 | 42 | 44 | 40 | 38 |
| | Ill. Ex. 12 | 42 | 38 | 37 | 36 | 34 | 33 |
| | Ill. Ex. 13 | 39 | 36 | 34 | 34 | 33 | 32 |

Illustrative Example 18

Compatibility Evaluation:

Example 10 and solvents (propylene glycol:isopropanol in a 70:30 ratio) were added to a vial to prepare a sample (3 grams total amount, 1% w/w of fluorinated polymer). Deionized water was added in 0.25 gram increments to the vial, and the vial was placed in a heated bath at 120° C. for 15 minutes. The vial was removed from the bath, and then visually inspected immediately and determined to be one phase. The addition of deionized water addition and heating were repeated until the mixture contained 60% by weight deionized water, based on the combined total weight of Example 10, solvents, and deionized water. No phase separation was observed, and the test was stopped.

Composition Preparation:

Example 10, containing a fluorinated polymer at 25% by weight in a 50:50 blend of MEK and methanol, and propylene glycol:isopropanol in a 70:30 ratio were combined to make 300 grams of a 1% by weight solution of the fluorinated polymer. The components were mixed together using a magnetic stirrer and magnetic stir bar.

Cores:

A core sample was cut from a sandstone block obtained from Cleveland Quarries under the trade designation "BEREA SANDSTONE". The core was 7.7 cm long and 2.5 cm in diameter with a pore volume of 8.2 mL and a porosity of 22% as measured by gas expansion.

Figure 3:
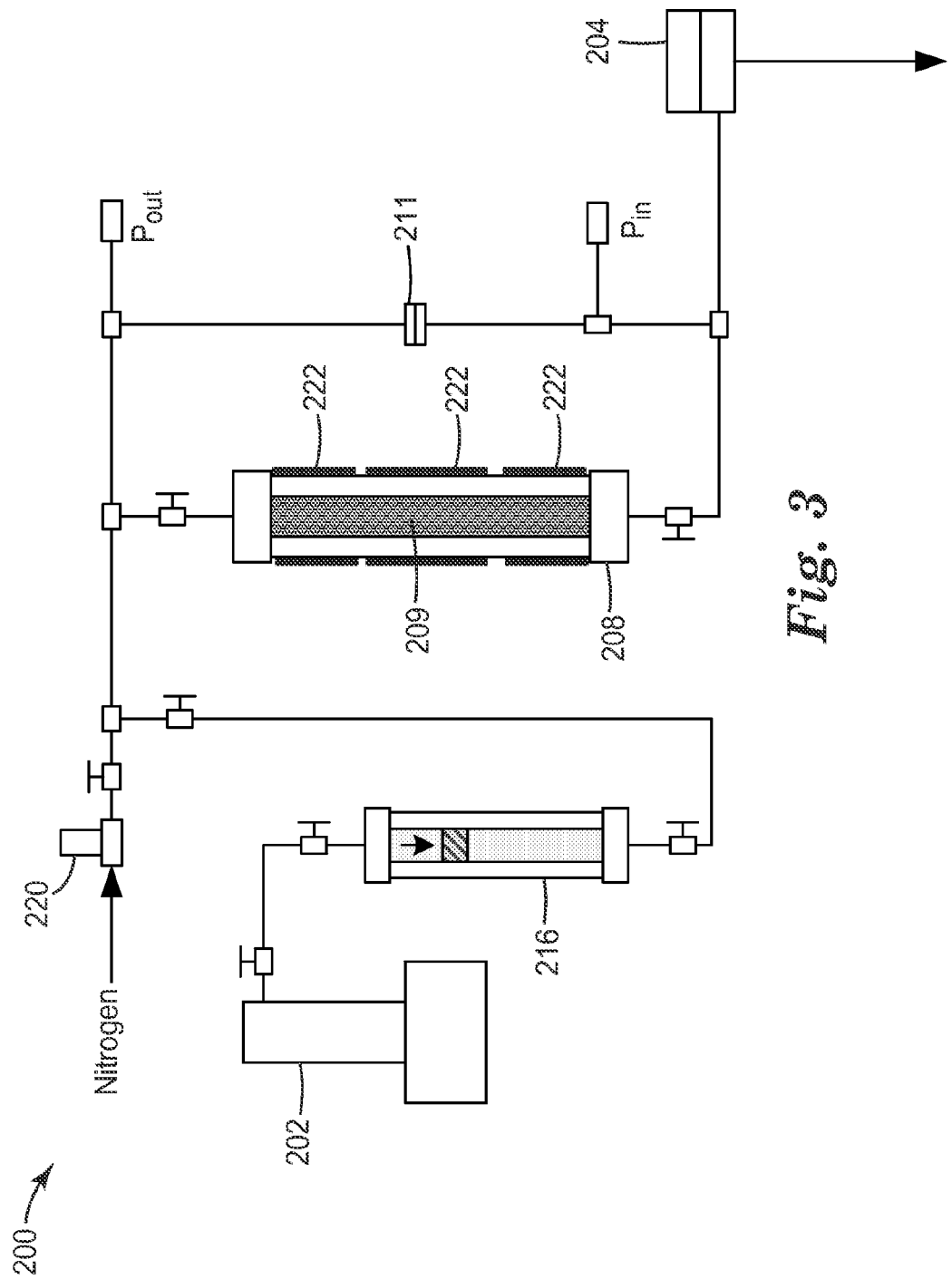
FIG. 3 is a schematic illustration of the core flood set-up used for Illustrative Examples 18 and 19.

Core Flood Setup and Procedure:

A schematic diagram of a core flood apparatus 200 used to determine relative permeability of a substrate sample (i.e., core) for Illustrative Example 18 is shown in FIG. 3. Core flood apparatus 200 included positive displacement pump 202 (Model QX6000SS, obtained from Chandler Engineering, Tulsa, Okla.) to inject n-heptane at constant rate into fluid accumulators 216. Nitrogen gas was injected at constant rate through a gas flow controller 220 (Model 5850 Mass Flow Controller, Brokks Instrument, Hatfield, Pa.). A pressure port 211 on high-pressure core holder 208 (Hassler-type Model RCHR-1.0 obtained from Temco, Inc., Tulsa, Okla.) were used to measure pressure drop across the vertical core 209. A back-pressure regulator (Model No. BP-50; obtained from Temco, Tulsa, Okla.) 204 was used to control the flowing pressure downstream of core 209. High-pressure core holder 208 was heated with 3 heating bands 222 (Watlow Thinband Model STB4A2AFR-2, St. Louis, Mo.).

The core was dried for 72 hours in a standard laboratory oven at 95° C. and then wrapped in aluminum foil and heat shrink tubing (obtained under the trade designation "TEFLON HEAT SHRINK TUBING" from Zeus, Inc., Orangeburg, S.C.). Referring again to FIG. 3, the wrapped core 209 was placed in core holder 208 at 75° F. (24° C.). An overburden pressure of 2300 psig ($1.6 \times 10^7$ Pa) was applied. The initial single-phase gas permeability was measured using nitrogen at low system pressures between 5 to 10 psig ($3.4 \times 10^4$ to $6.9 \times 10^4$ Pa).

Deionized water was introduced into the core 209 by the following procedure to establish a water saturation of 26% (i.e., 26% of the pore volume of the core holder was saturated with water). The outlet end of the core holder was connected to a vacuum pump and a full vacuum was applied for 30 minutes with the inlet closed. The inlet was connected to a burette with the water in it. The outlet was closed and the inlet was opened to allow 2.1 mL of water to flow into the core. The inlet and the outlet valves were then closed for 16 hours. The gas permeability was measured at the water saturation by flowing nitrogen at 500 psig ($3.4 \times 10^6$ Pa) and 75° F. (24° C.).

The core holder 208 was then heated to 250° F. (121° C.) for several hours. Nitrogen and n-heptane were co-injected into the core at an average total flow rate in the core of 450 mL/hour at a system pressure of 900 psig ($6.2 \times 10^6$ Pa) until steady state was reached. The flow rate of nitrogen was controlled by gas flow controller 220, and the rate for n-heptane was controlled by positive displacement pump 202. The flow rates of nitrogen and n-heptane were set such that the fractional flow of gas in the core was 0.66. The gas relative permeability before treatment was then calculated from the steady state pressure drop. The fluorinated polymer composition was then injected into the core at a flow rate of 120 mL/hour for 20 pore volumes. Nitrogen and n-heptane co-injection was resumed at an average total flow rate in the core of 450 mL/hour at a system pressure of 900 psig ($6.2 \times 10^6$ Pa) until steady state was reached. The gas relative permeability after treatment was then calculated from the steady state pressure drop.

The initial single-phase gas permeability, measured after water saturation, the gas relative permeability before treatment with the fluorinated material composition, the gas relative permeability after treatment, the ratio of the gas relative permeabilities after and before treatment (i.e., improvement factor) are reported in Table 12, below.

TABLE 12

| | Ill. Ex. 18 | Ill. Ex. 19 |
|---|---|---|
| Gas permeability, millidarcy (md) | 274 | 104 |

TABLE 12-continued

|  | Ill. Ex. 18 | Ill. Ex. 19 |
|---|---|---|
| Gas relative permeability before treatment | 0.15 | 0.019 |
| Gas relative permeability after treatment | 0.21 | 0.027 |
| Improvement factor | 1.4 | 1.4 |

Illustrative Example 19

A core flood was carried out for Illustrative Example 19 using the method of Illustrative Example 18 except for the following modifications.
Composition Preparation: 300 grams of propylene glycol:isopropanol in a 70:30 ratio were combined to make the treatment solution. No fluorinated polymer was used.
Cores:
The sandstone core was 7.7 cm long and 2.5 cm in diameter with a pore volume of 7.2 mL.
The initial single-phase gas permeability, measured after water saturation, the gas relative permeability before treatment with the fluorinated material composition, the gas relative permeability after treatment, the ratio of the gas relative permeabilities after and before treatment (i.e., improvement factor) are reported in Table 12, above. At the end of the core flood procedure, the post-treatment gas relative permeability was starting to decrease.

Various modifications and alterations of this disclosure may be made by those skilled the art without departing from the scope and spirit of the disclosure, and it should be understood that this disclosure is not to be unduly limited to the illustrative embodiments set forth herein.

What is claimed is:

1. A fluorinated polymer comprising:
first divalent units independently represented by formula:

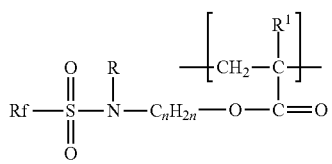

in a range from 15 to 75 percent by weight, based on the total weight of the fluorinated polymer, and
second divalent units independently represented by formula:

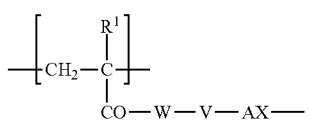

in a range from 25 to 85 percent by weight, based on the total weight of the fluorinated polymer,
wherein
Rf represents a fluoroalkyl group having from 1 to 6 carbon atoms;
each $R^1$ is independently hydrogen or methyl;
W is —O—;
V is alkylene;
A is

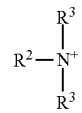

R and $R^3$ are each independently alkyl having 1 to 4 carbon atoms;
$R^2$ is alkyl having 1 to 20 carbon atoms;
X— is a counter anion; and
n is an integer from 2 to 11.

2. The fluorinated polymer according to claim 1, wherein Rf represents a perfluorobutyl group.

3. The fluorinated polymer according to claim 1, wherein W is —O—, V is alkylene having from 2 to 6 carbon atoms, A is

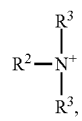

$R^2$ and $R^3$ are each methyl, and X— is Cl—, Br—, or I—.

4. The fluorinated polymer according to claim 1, wherein the fluorinated polymer is free of repeating alkyleneoxy units.

5. The fluorinated polymer according to claim 1, wherein the first divalent units and the second divalent units are each present in a range from 35 to 65 percent by weight, based on the total weight of the fluorinated polymer.

6. A composition comprising at least one of organic solvent or water and the fluorinated polymer according to claim 1.

7. The composition according to claim 6, wherein the organic solvent comprises at least one of a polyol or polyol ether, and wherein the polyol and polyol ether independently have from 2 to 25 carbon atoms.

8. The composition according to claim 6, wherein the organic solvent comprises at least one monohydroxy alcohol, ether, or ketone, each independently having up to 4 carbon atoms.

9. A method comprising treating a hydrocarbon-bearing formation with a composition according to claim 6.

10. The method according to claim 9, wherein the solvent comprises at least one of a polyol or polyol ether independently having from 2 to 25 carbon atoms.

11. The method according to claim 9, wherein the solvent comprises at least one of monohydroxy alcohol, ether, or ketone each independently having up to 4 carbon atoms.

12. The method according to claim 9, wherein the hydrocarbon-bearing formation has brine, and wherein the solvent at least one of at least partially solubilizes or at least partially displaces the brine in the hydrocarbon-bearing formation.

13. The method according to claim 12, further comprising treating the hydrocarbon-bearing formation with a fluid prior to treating the hydrocarbon-bearing formation with the composition, wherein the fluid at least one of at least partially solubilizes or at least partially displaces the brine in the hydrocarbon-bearing formation.

14. The method according to claim 9, wherein the hydrocarbon-bearing formation is predominantly sandstone, and wherein the fluorinated polymer is adsorbed on the hydrocarbon-bearing formation.

15. The method according to claim 9, wherein the hydrocarbon-bearing formation has at least one fracture, wherein the fracture has a plurality of proppants therein, and wherein the fluorinated polymer is adsorbed on at least a portion of the plurality of proppants.

16. The method according to claim 9, wherein R is methyl or ethyl, Rf represents a fluoroalkyl group having up to 4 carbon atoms, W is —O—, V is alkylene having from 2 to 6 carbon atoms, A is

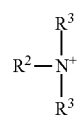

and $R^2$ and $R^3$ are each methyl.

17. The method according to claim 9, wherein W is —O—, V is alkylene having from 2 to 6 carbon atoms, A is

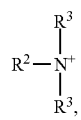

and $R^2$ and $R^3$ are each methyl.

* * * * *